United States Patent [19]
Sawyer

[11] 3,836,835
[45] Sept. 17, 1974

[54] MULTI AXES LINEAR MOVEMENT POSITIONING SYSTEM

[76] Inventor: Bruce A. Sawyer, 20120 Allentown Dr., Woodland Hills, Calif. 91364

[22] Filed: Apr. 19, 1971

[21] Appl. No.: 135,077

[52] U.S. Cl. ............... 318/685, 318/696, 318/651, 318/687, 318/135, 318/571, 318/175, 318/13
[51] Int. Cl. ............................................ G05b 19/40
[58] Field of Search ........... 318/175, 178, 179, 184, 318/611, 200, 218, 221, 222, 685, 696, 651, 135

[56] References Cited
UNITED STATES PATENTS

| | | | |
|---|---|---|---|
| 2,907,939 | 10/1959 | Sant Angelo | 318/611 X |
| 2,954,514 | 9/1960 | Hemstreet | 318/611 |
| 3,012,180 | 12/1961 | Finvold | 318/621 X |

OTHER PUBLICATIONS
IBM Tech. Disc. Bull., J. T. Hollaway, Vol. 12, No. 6, November 1969, pp. 744 and 745.

*Primary Examiner*—T. E. Lynch
*Attorney, Agent, or Firm*—Smyth, Roston & Pavitt

[57] ABSTRACT

A synchronous motor having a movable member and a stationary member receives signals which apply a controllable power angle to the motor as measured between the actual displacement between the movable and stationary members and the input signals to the motor. The power angle is used to control the operation of the motor and may be produced by combining in a particular relationship input signals which may be provided with a periodic relationship. The motor may be a linear type of motor wherein a head is disposed in contiguous relationship to a platen and is movable along the platen on a single axis or a pair of coordinate axes.

A servo loop may also be provided for the synchronous motor. The servo loop receives signals representing a function of the actual displacement of the movable member relative to the stationary member. Such signals may represent the displacement, velocity or acceleration, or any combination of such parameters, of the movable members relative to the stationary member. The signals produced by the servo loop control the power angle produced in the motor. When the signals represent velocity, the servo loop acts to damp the displacement of the movable member relative to the stationary member. When the signals represent displacement or acceleration, the servo loop acts to control on an optimal basis the displacement of the movable member relative to the stationary member.

25 Claims, 32 Drawing Figures

PATENTED SEP 17 1974 3,836,835

INVENTOR:
Bruce A. Sawyer

By Smyth, Roston & Pavitt
ATTORNEYS

Fig. 5

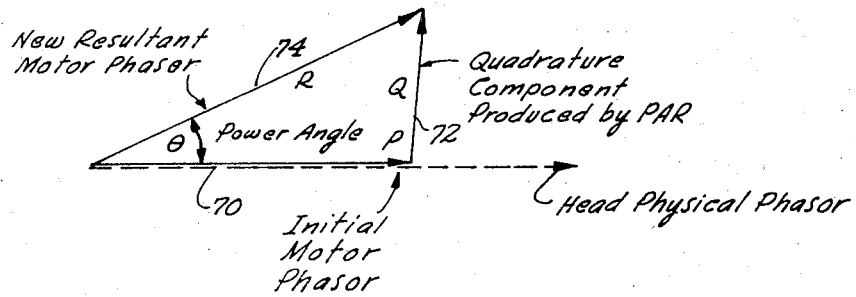

$Force_{(Single\ Axis)} = R\sin\theta = Q$

Fig. 6

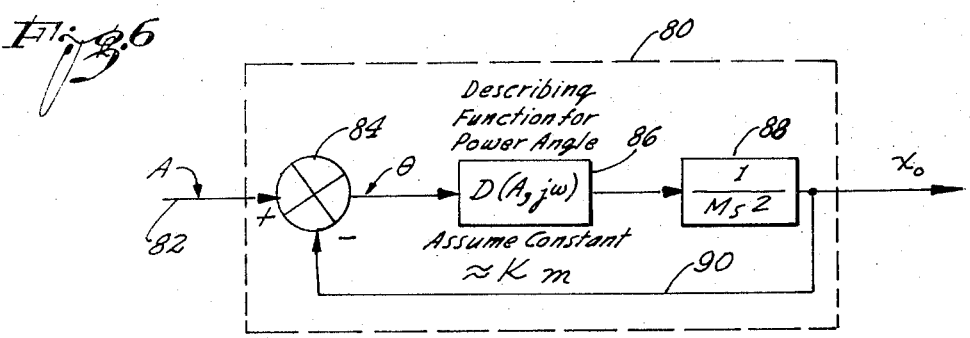

Block Diagram Representation of One Axis of Unloaded Motor. (There are NO Mech. Loads Except Mass M of Head)

$$G_h(s) = \frac{x_o}{A}(s) = \frac{G(s)}{1+G(s)} = \frac{\frac{Km}{Ms^2}}{1+\frac{Km}{Ms^2}} = \frac{1}{\frac{M}{Km}s^2+1}$$

A = Input Phasor to Sync Motor (NOT Acceleration)
$x_o$ = Output Displacement of Head Mass (i.e. Moveable Parts of Motor)
M = Mass of Head
θ = Power Angle of Motor

Fig. 6a

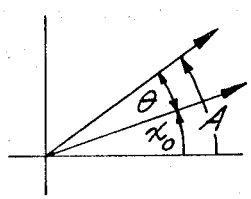

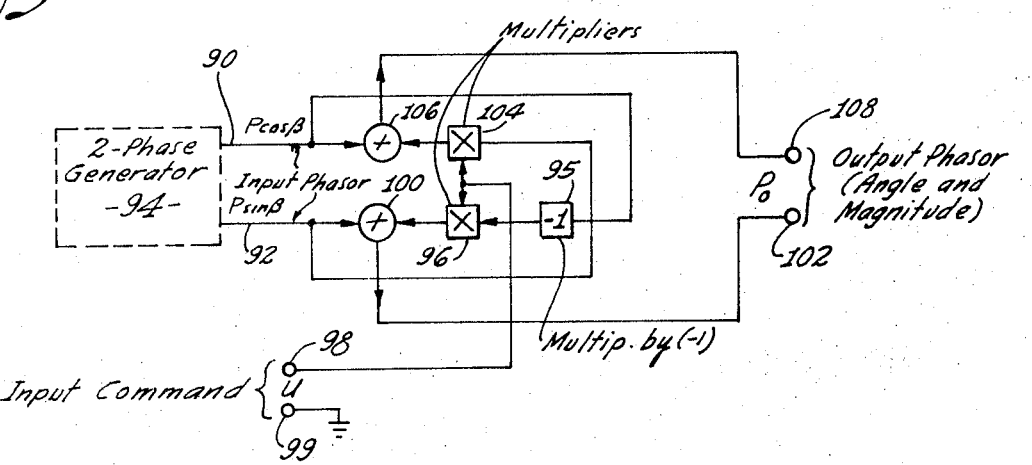

Fig. 7

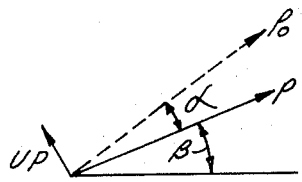

Fig. 7a $$\overline{P_o} = \overline{P} + \overline{UP} = P(\cos\beta + j\sin\beta) + UP(\sin\beta - j\cos\beta)$$
$$\overline{P_o} = P\,e^{j\beta} + UP\,e^{j(\beta+\frac{\pi}{2})} \qquad e^{j\beta} = \cos\beta + j\sin\beta$$
$$\overline{P_o} = \sqrt{1+U^2}\,P\,e^{j(\beta+\alpha)} \qquad e^{j(\beta+\frac{\pi}{2})} = \sin\beta - j\cos\beta$$

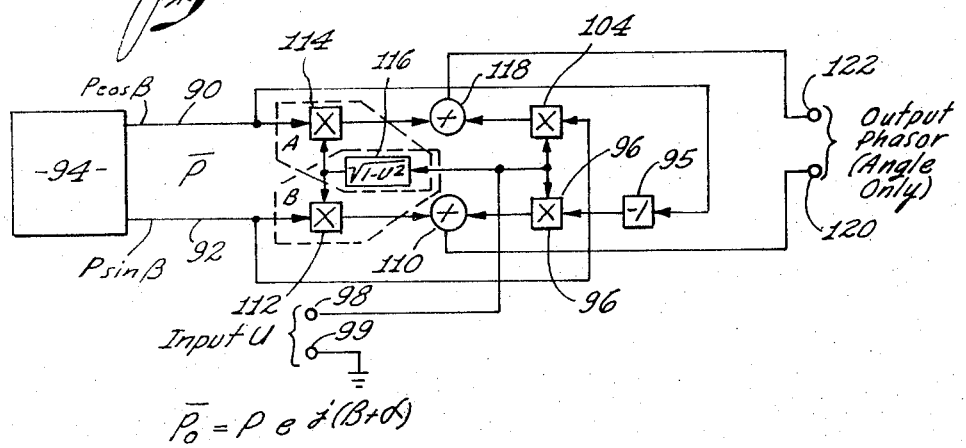

Fig. 8

$$\overline{P_o} = P\,e^{j(\beta+\alpha)}$$

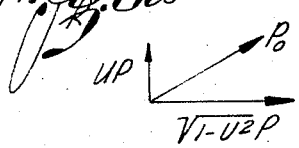

Fig. 8a $$\overline{P_o} = P\sqrt{U^2+(1-U^2)} = \overline{P}$$

INVENTOR:
Bruce A. Sawyer

ATTORNEYS

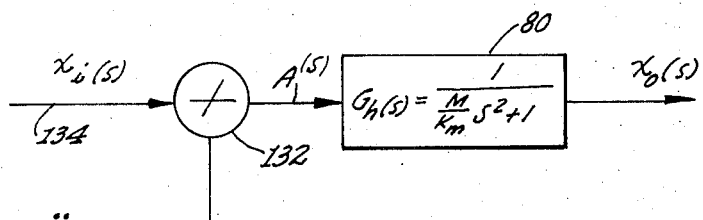
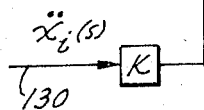

Fig. 9

① $A(s) = x_i + K\ddot{x}_i = (1+Ks^2)x_i(s)$
② $A(s)G_h(s) = x_o$
③ $(1+Ks^2)x_i(s)\left(\frac{1}{\frac{M}{K_m}s^2+1}\right) = x_o(s)$
④ $\frac{x_o}{x_i}(s) = \frac{Ks^2+1}{\frac{M}{K_m}s^2+1}$

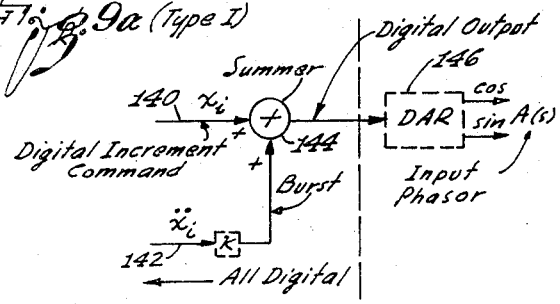

Fig. 9a (Type I)

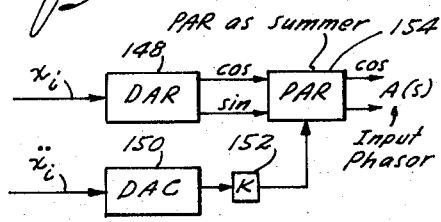

Fig. 9b (Type II)

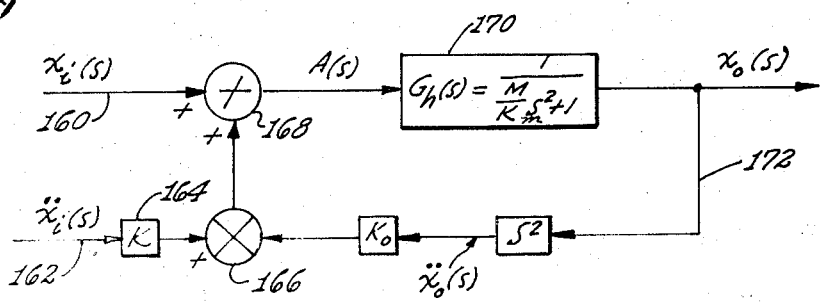

Fig. 10

① $A(s)G_h(s) = x_o(s)$
② $A(s) = x_i(s) + K\ddot{x}_i(s) - K_o\ddot{x}_o = x_i(s) + Ks^2x_i(s) - K_os^2x_o(s)$
③ $\frac{x_o(s)}{G_h(s)} = (Ks^2+1)x_i - K_os^2x_o$
④ $\left(K_os^2 + \frac{1}{G_h(s)}\right)x_o = (Ks^2+1)x_i$
⑤ $\frac{x_o}{x_i}(s) = \frac{Ks^2+1}{K_os^2 + \frac{M}{K_m}s^2+1} = \frac{Ks^2+1}{\left(\frac{M}{K_m}+K_o\right)s^2+1}$ INVENTOR:
Bruce A. Sawyer By Smyth, Roston & Pavitt
ATTORNEYS

Fig. 11

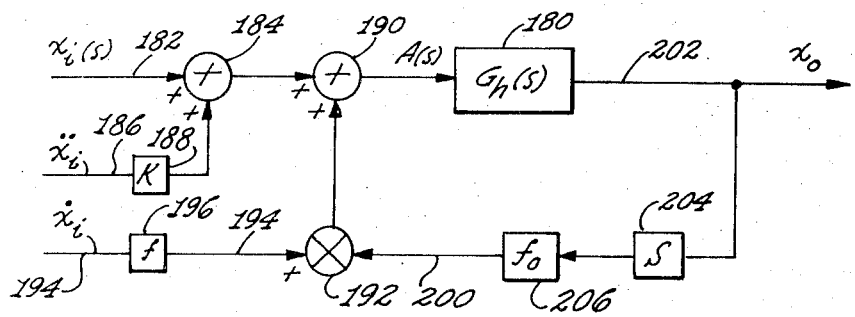

① $A(s) \cdot G_h(s) = x_o(s)$

② $A(s) = x_i(s) + K\ddot{x}_i(s) + f\dot{x}_i - f_o\dot{x}_o = x_i + Ks^2 x_i + fsx_i - f_o s x_o$ ③ $A(s) = \dfrac{x_o(s)}{G_h(s)} = (Ks^2 + fs + 1) x_i - f_o s x_o$ ④ $\left(f_o s + \dfrac{1}{G_h(s)}\right) x_o = (Ks^2 + fs + 1) x_i$ ⑤ $\dfrac{x_o}{x_i} = \dfrac{Ks^2 + fs + 1}{\dfrac{M}{K_m} s^2 + f_o s + 1}$

Fig. 12

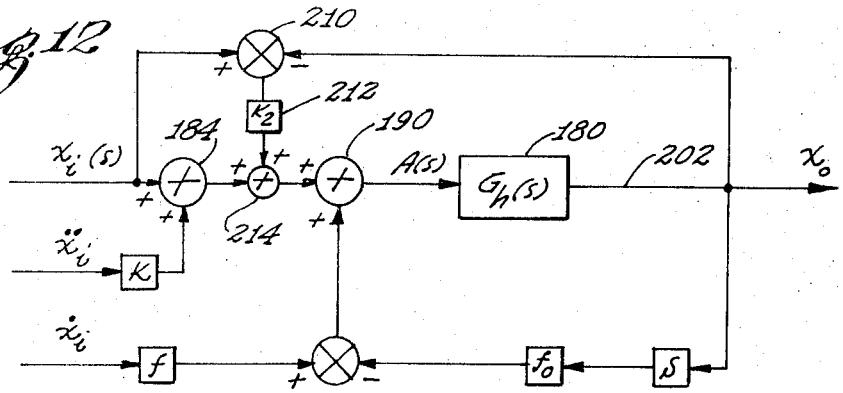

① $A(s) \cdot G_h(s) = x_o(s)$

② $A(s) = x_i(s) + K\ddot{x}_i(s) + f\dot{x}_i - f_o\dot{x}_o = x_i + Ks^2 x_i + fsx_i - f_o s x_o + K_e(x_i - x_o)$ ③ $A(s) = \dfrac{x_o(s)}{G_h(s)} = (Ks^2 + fs + K_e + 1) x_i - f_o s x_o - K_e x_o$ ④ $\left(f_o s + K_e + \dfrac{1}{G_h(s)}\right) x_o = (Ks^2 + fs + K_e + 1) x_i$ ⑤ $\dfrac{x_o}{x_i} = \dfrac{Ks^2 + fs + K_e + 1}{\dfrac{M}{K_m} s^2 + f_o s + K_e + 1}$ INVENTOR:
Bruce A. Sawyer

ATTORNEYS

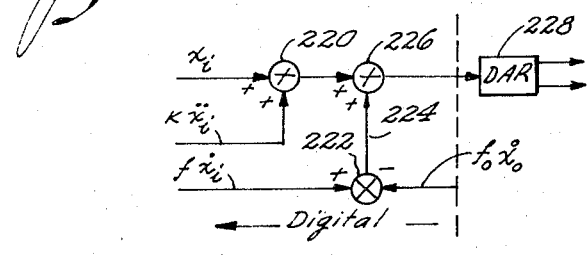
Fig. 13a (Type I) All Digital
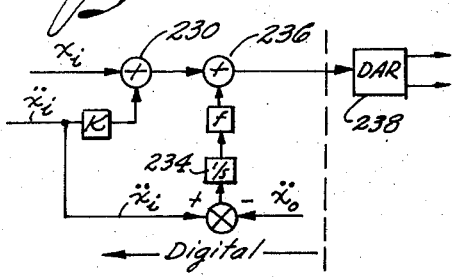
Fig. 13b (Type Ia)
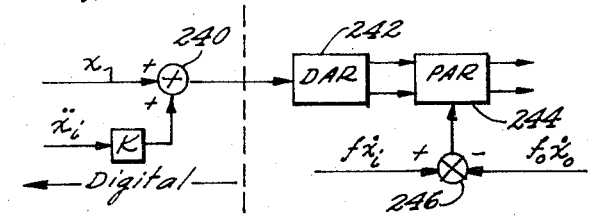
Fig. 13c (Type II)
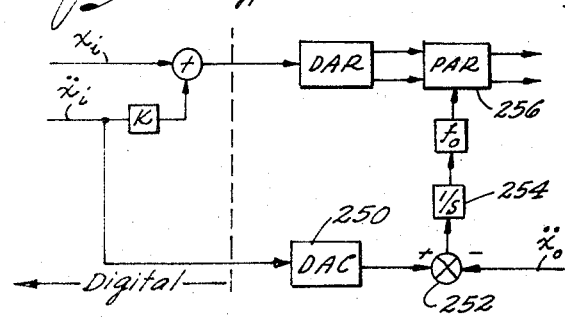
Fig. 13d (Type IIa)
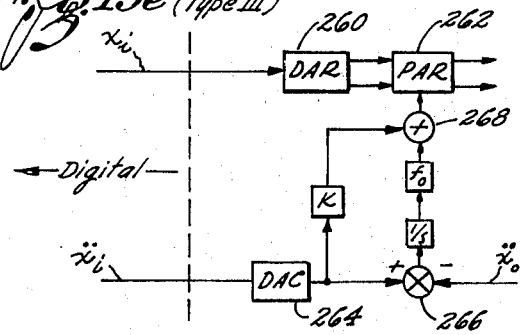
Fig. 13e (Type III)
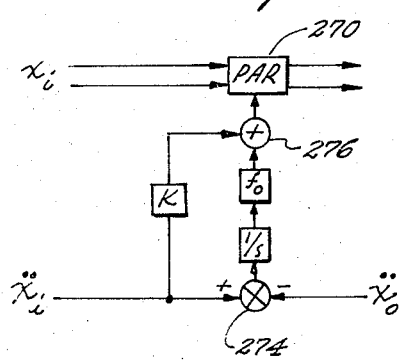
Fig. 13f (Type IV) All Analog
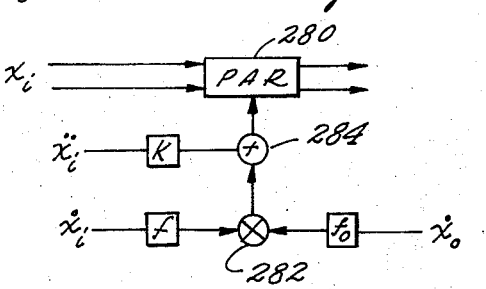
Fig. 13g (Type V) All Analog
INVENTOR
Bruce A. Sawyer
ATTORNEYS

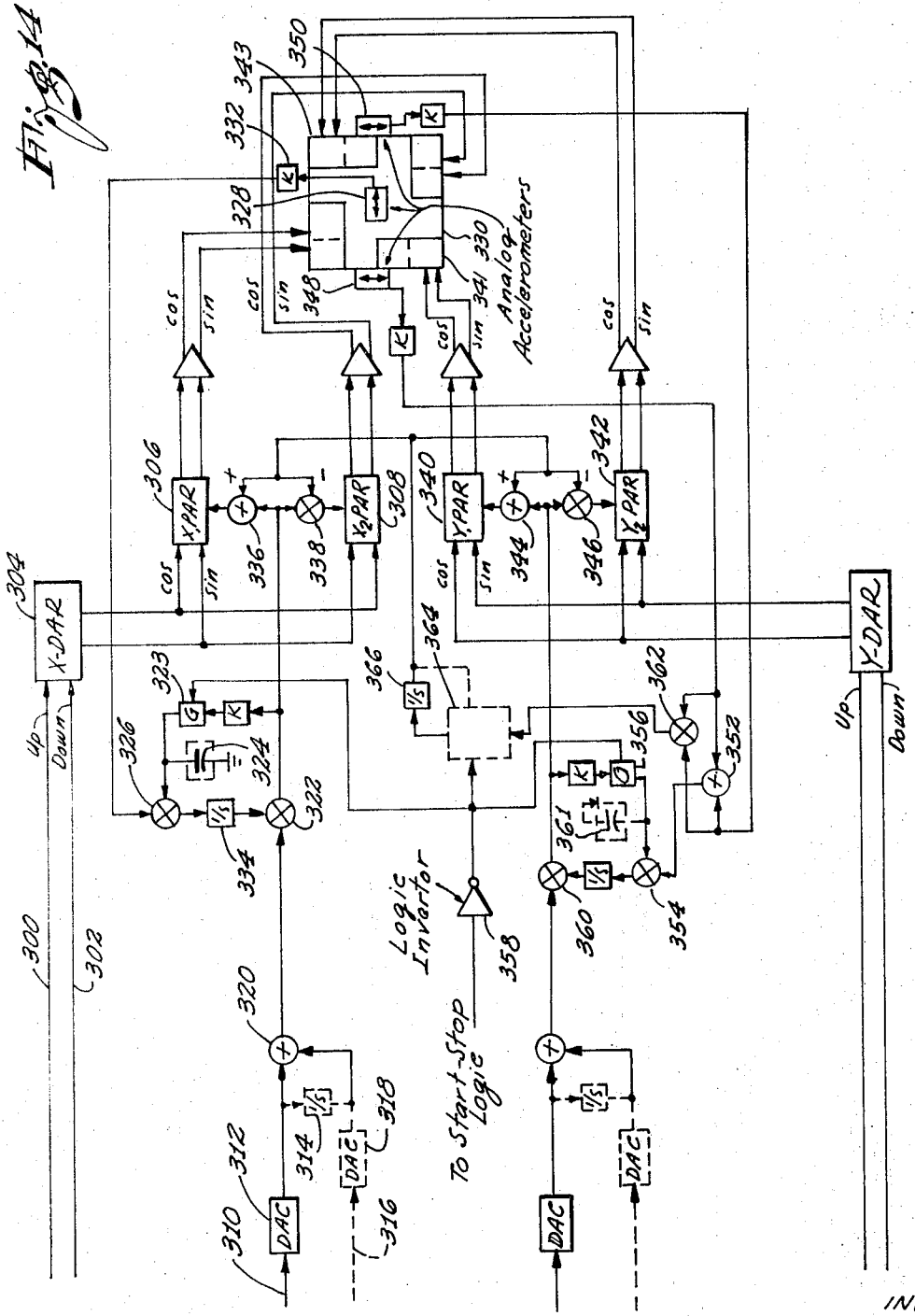

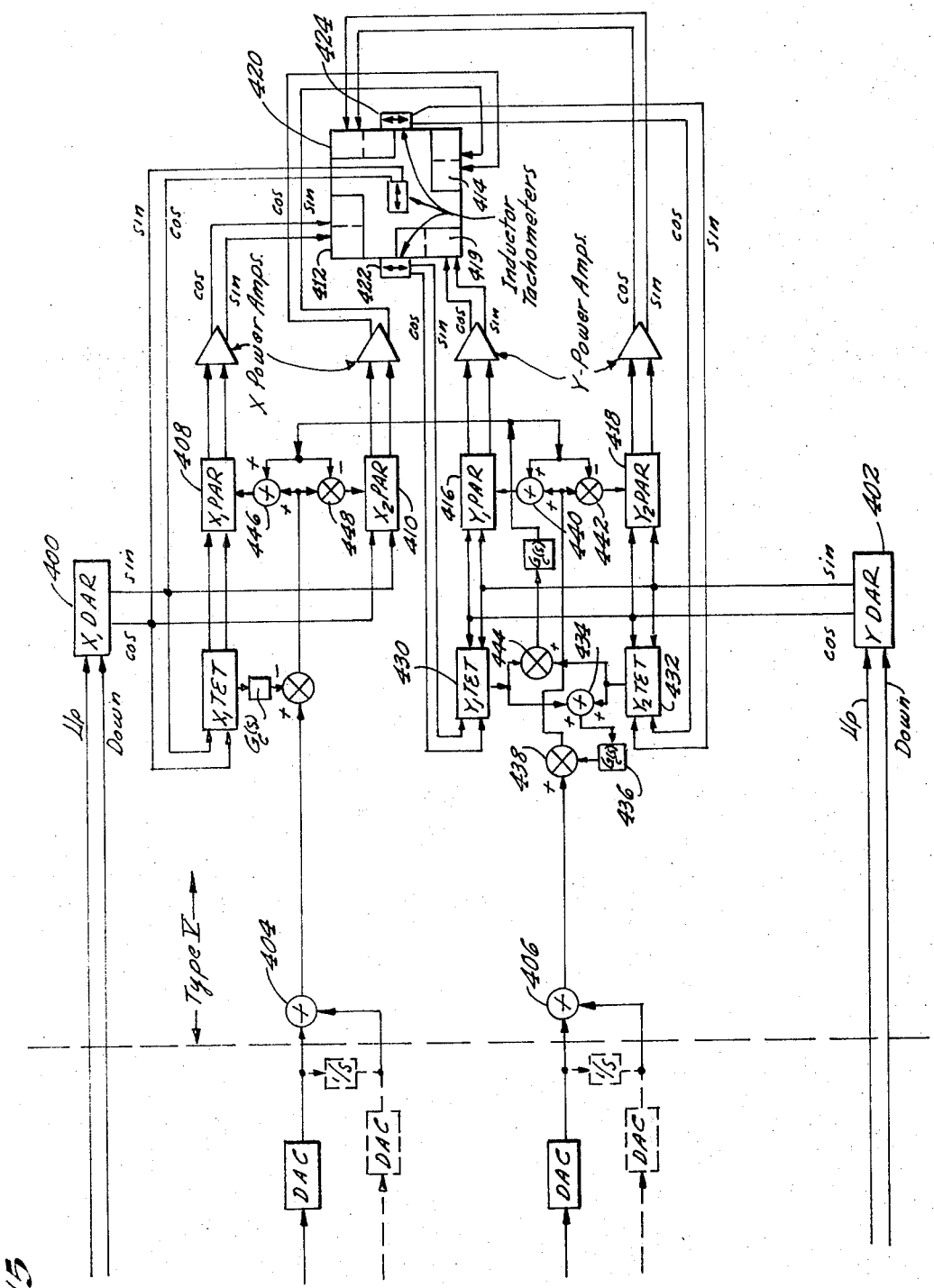

Note: $2\pi y_1 / P \equiv 2\pi y_0 / P + \alpha$ $$E_0 E \frac{dy_0}{dt} \cos \frac{2\pi y_0}{P} \cos\left(\frac{2\pi y_0}{P}+\alpha\right) + E_0 E \frac{dy_0}{dt} \sin \frac{2\pi y_0}{P} \sin\left(\frac{2\pi y_0}{P}+\alpha\right)$$

$$= E_0 E \frac{dy_0}{dt} \cos\left(\frac{2\pi y_0}{P} - \frac{2\pi y_0}{P} - \alpha\right) = E_0 E \frac{dy_0}{dt} \cos(-\alpha)$$

INVENTOR
Bruce A. Sawyer

ATTORNEYS

MULTI AXES LINEAR MOVEMENT POSITIONING SYSTEM

This invention relates to synchronous motors and more particularly to systems for providing precise control over the operation of such motors. The invention particularly relates to systems employing synchronous motors and providing a controllable power angle for the signals which are applied to energize such motors. The invention also relates to systems providing servo loops for controlling the power angle of the signals which are applied to energize the motors.

Synchronous motors are often used to produce a movement of an output member. Synchronous motors are advantageous since they produce a movement of a first member relative to a second member in synchronism with the periodicity of input signals applied to the motor. For example, when alternating signals having a particular frequency are applied to the motor, the first member moves relative to the second member through incremental distances at rates proportional to the frequency of the input signals. Synchronous motors are also advantageous because, for a given mass, the first member can be accelerated or decelerated relative to the second member faster than in other types of motors such as induction motors.

Under some circumstances the displacement of the movable member in the synchronous motor is not exactly proportional to the periodicity of the input signals. For example, under some circumstances the movable member may resonate so that the displacement of the movable member on an instantaneous basis is not proportional to the input signals. When the synchronous motor drives an output member such as a tool or a stylus, the resonance of the rotor causes errors to be produced in the instantaneous displacement of the output member. Such resonances are always undesirable and sometimes may be of such magnitude as to impair the performance of the output member such as the tool or stylus.

Considerable effort has been made to provide a controlled displacement of the movable member relative to the stationary member in a synchronous motor so that undesirable effects such as resonances of the rotor are avoided. However, such efforts have not been entirely successful, particularly since the synchronous relationship between the input signals and the displacement of the movable member have made it difficult to control on a precise basis at each instant the displacement of the movable member.

This application discloses and claims an invention for overcoming the above difficulties. In one aspect of the invention, the power angle of the motor is adjusted on a controlled basis to provide an error function which provides an enhanced control over the displacements of the movable member relative to the stationary member. The power angle may be defined as the angle between the phasor or vector of the actual displacement of the movable member relative to the stationary member and the phasor or vector of the input signals to the motor. The power angle can be controllably adjusted by instantaneously shifting the phase of the input signals through a controllable angle. This produces force on a controlled basis.

Servo loops are also included in this invention to receive signals representing a function of the actual displacement of the movable member relative to the stationary member. Such signals may represent the displacement, velocity or acceleration, or any combination of such parameters, of the movable member relative to the stationary member. The signals produced by the servo loop control the power angle produced in the motor. When the signals represent velocity, the servo loop tends to damp the displacement of the movable member relative to the stationary member so as to eliminate or at least minimize any tendency for the movable member to resonate. When the signals represent displacement or acceleration, the servo loop acts to control the resonant frequency of the movable member, thereby controlling under ideal conditions the displacement of the movable member relative to the stationary member.

The invention disclosed and claimed in this application has particular utility when used with the synchronous motor disclosed and claimed in U.S. Patent Nos. 3,376,578 and 3,457,482. Such patents disclose and claim a synchronous motor including a platen and a head movable relative to the platen along either a single axis or a pair of coordinate axes. When the head is movable relative to the platen along the pair of coordinate axes, the movement can occur simultaneously along each axis with the movement along each axis being independent of the movement along the other axis.

Since the head is displaced from the platen, the movement of the head along the platen can occur at high velocities and with considerable accelerations and decelerations, particularly since the mass of the head is relatively low. The linear synchronous motors disclosed and claimed in U.S. Pat. Nos. 3,376,578 and 3,457,482 are also advantageous since the displacement of the head relative to the platen along the single axis or along the pair of coordinate axes can be determined at each instant by the head.

By providing a controllable power angle to the linear synchronous motor, the displacements of the head relative to the platen can be controlled to provide an optimum displacement of the head relative to the platen at each instant. This optimum displacement of the head corresponds to a desired displacement represented by the input signals. The servo loop also operates to damp any resonances of the head, particularly when the servo loop controls the power angle by feeding signals representing velocity from the output of the head to the input of the head.

In the drawings:

FIG. 5 is a diagram of the phasor relationship between the disposition of the head at each instant and the inputs to the head for driving the head;

FIG. 6 is a schematic diagram of a system including an open loop servo for driving the motor shown in FIGS. 1 to 4a, inclusive, and further includes equations indicating the operation of the system;

FIG. 6a is a phasor diagram of the phasor relationship between various parameters in the system shown in FIG. 6;

FIG. 7 is a subsystem diagram in block form of one of the stages of the system shown in FIG. 6;

FIG. 7a is a diagram of the phasor relationship between the inputs to the subsystem shown in FIG. 7 and the outputs from the subsystem shown in FIG. 7;

FIG. 8 is a subsystem diagram in block form of another embodiment of the same stage as is represented by the subsystem shown in FIG. 7;

FIG. 8a illustrates the phasor relationships between the inputs to the subsystem shown in FIG. 8 and the output from the subsystem shown in FIG. 8;

FIG. 9 illustrates in block form a system including an open loop servo with an acceleration command for controlling the operation of a synchronous motor and further includes equations indicating the operation of the system;

FIG. 9a illustrates a system similar to that shown in FIG. 9 for operating in response to digital signals;

FIG. 9b illustrates a system which operates in response to analog signals in a manner similar to the system shown in FIG. 9;

FIG. 10 illustrates in block form a system operating on a closed loop basis to control the operation of the motor in response to acceleration commands and acceleration feedbacks and further includes equations indicating the operation of the system;

FIG. 11 illustrates in block form a system for controlling the operation of the synchronous motor in response to acceleration commands and velocity feedbacks and further includes equations indicating the operation of the system;

FIG. 12 illustrates in block form a system for controlling the operation of a synchronous motor in response to acceleration commands and velocity feedbacks and for providing a displacement error loop and further includes equations indicating the operation of the system;

Figure 16:
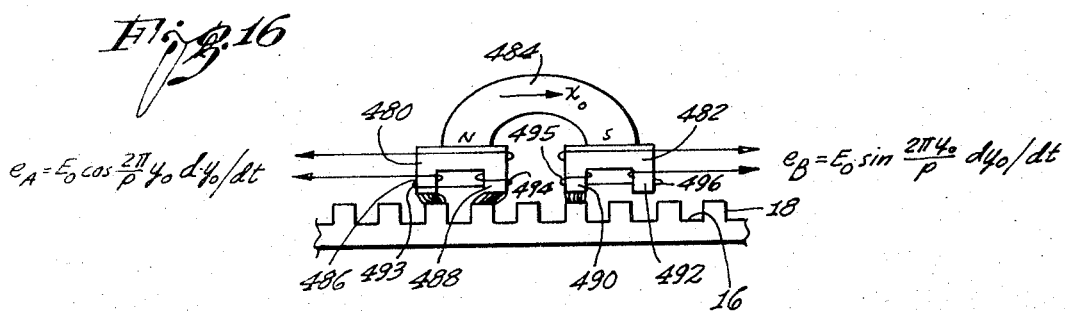
Figure 17:
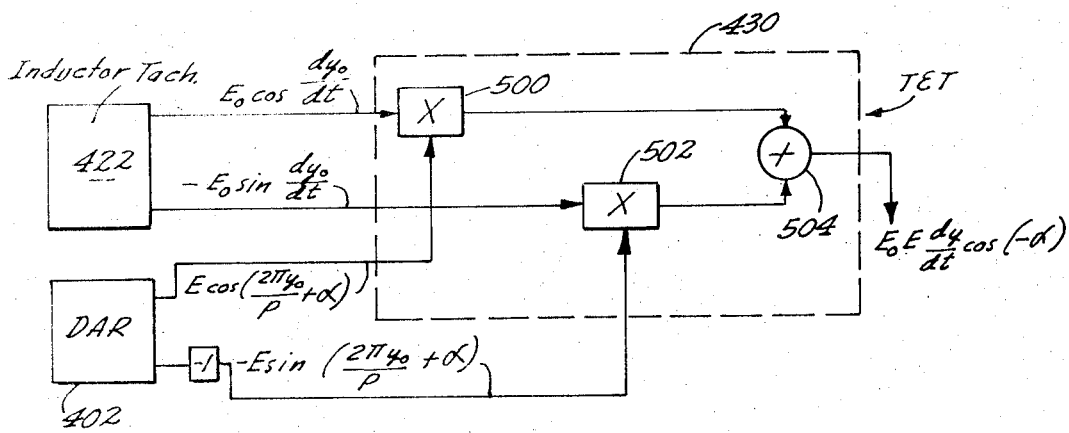
Figure 18:
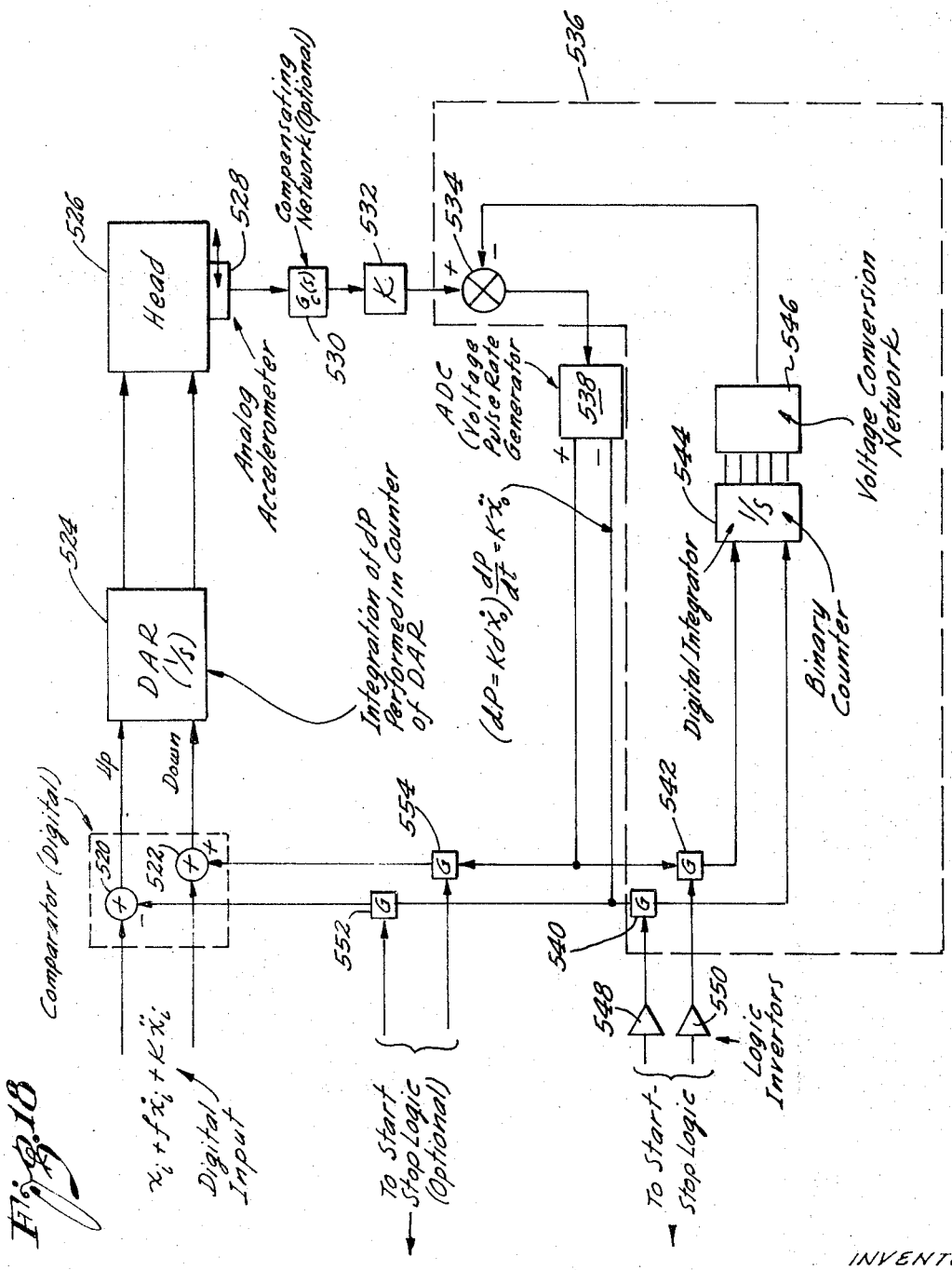
Figure 19:
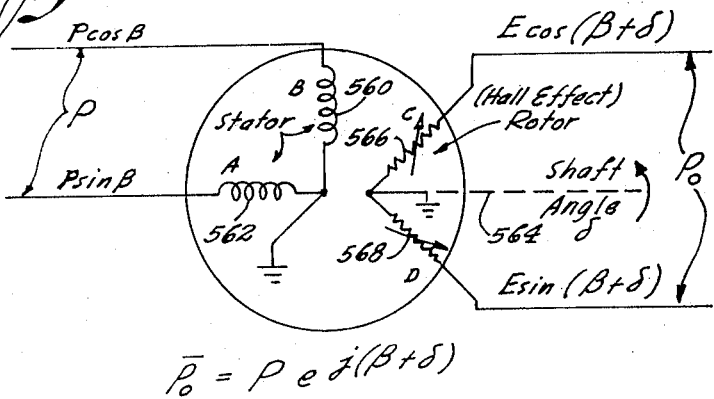
Figure 20:
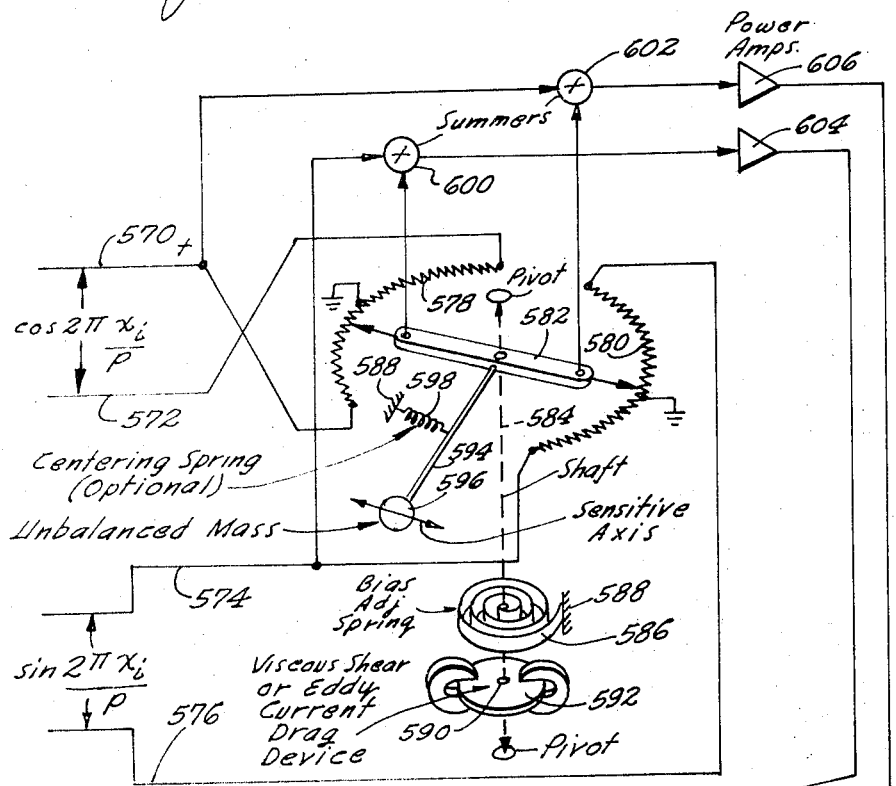

FIGS. 13a to 13g, inclusive, illustrate in block form various types of systems for controlling the operation of a synchronous motor with acceleration commands and velocity feedbacks;

FIG. 14 illustrates in block form a system for controlling the movement of a head relative to a platen with velocity feedbacks and for damping any rotation of the head relative to the platen about an axis substantially normal to the surface defined by the coordinate axes along which the head moves;

FIG. 15 illustrates in block form a system for controlling the movement of a head relative to a platen in response to signals from inductor tachometers movable with the head;

FIG. 16 illustrates one embodiment of an inductor tachometer which is included in the system shown in FIG. 15;

FIG. 17 illustrates in block form a subsystem constituting one of the stages included in the system shown in FIG. 15 and further includes equations indicating the operation of this subsystem;

FIG. 18 illustrates in block form another embodiment of the system for controlling the operation of a synchronous motor with a velocity feedback of a digital nature;

FIG. 19 illustrates another embodiment of a system for shifting the phasor angle in accordance with the relationship illustrated in FIG. 7a; and FIG. 20 illustrates another embodiment of a system for shifting the phasor angle in accordance with the relationship illustrated in FIG. 7a and for damping the displacements of the head relative to the platen.

In one embodiment of the invention a linear reluctance motor generally indicated at 10 is provided with a platen 12 and a head 14. The linear reluctance motor may be constructed in a manner similar to that disclosed and claimed in U.S. Pat. No. 3,376,578 issued to me on Apr. 2, 1968 for a "MAGNETIC POSITIONING DEVICE" and U.S. Pat. No. 3,457,482 issued to me on July 22, 1969 for a "MAGNETIC POSITIONING DEVICE." The linear reluctance motor may be constructed to provide a movement of the head 14 relative to the platen 12 along a single axis or along a pair of coordinate axes. The linear reluctance motor may be constructed to operate on magnetic principles such as disclosed in U.S. Pat. Nos. 3,376,578 and 3,457,482 or along pneumatic principles such as disclosed and claimed in U.S. Pat. application Ser. No. 101,998 filed by me on Dec. 28, 1970 for a "DRIVE OR INDICATING SYSTEM EMPLOYING FLUID CONTROLS" or on other principles such as capacitive principles.

When the linear reluctance motor is constructed to operate on magnetic principles such as disclosed in U.S. Pat. Nos. 3,376,578 and 3,457,482, the platen 12 may be made from a ferromagnetic material and may be provided with grooves 16 at spaced positions to define magnetic teeth 18. In a typical structure, the grooves 16 are 0.020 inches wide and 0.020 inches deep and are spaced 0.040 inches apart between centerlines. The spacing between the centerlines of the grooves may be defined as the pitch of the grooves. The grooves may be left open with the air serving as a non-magnetic material but it is preferred to fill the grooves with a plastic or other non-magnetic solids to provide a smooth upper surface for the platen 12. In effect the grooves 16 and the teeth 18 define a grid structure.

When the movable member such as the head is movable relative to the stationary member such as the platen along a single axis, the movable member includes two sets of magnets 20 and 22 mounted in a housing or base 24 with the pole faces of the magnets at the surface of the base. Typically the base 24 may be an aluminum or plastic plate having two apertures for receiving the magnet sets. The magnet sets 20 and 22 are disposed substantially parallel to the platen 12 and are used to propel and position the head 14 along the platen.

Since the construction of the two sets of magnets 20 and 22 may be the same, one will be described in detail. Each set may comprise two magnets and each magnet may have two pole pieces. The magnet set 20 includes a frame 26 and pole pieces 28, 30, 32 and 34. Each of the pole pieces 28, 30, 32 and 34 may comprise a stack of lamination stampings. A winding 36 may be wound in magnetically coupled relationship to the pole pieces 28 and 30 and a winding 38 may be wound in magnetically coupled relationship to the pole pieces 32 and 34. A U-shaped magnet 40 including the pole pieces 32 and 34 is fixed to a rib 42 of the frame 26 as by a screw and a similar magnet 44 including the pole pieces 32 and 34 is affixed to a rib 46 of the frame 26. The frame 26 is made from a non-magnetic material such as aluminum and, in the preferred embodiment, the magnets 40 and 44 are permanent magnets which provide a biasing or polarizing flux in the associated pole pieces.

Figure 3:
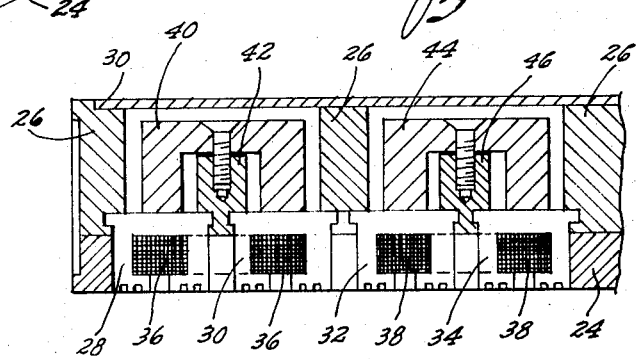
FIG. 3 is an enlarged fragmentary elevational view in section of a portion of the head shown in FIG. 2.

The bottom face of each of the pole pieces 28 and 30 has teeth of magnetic material and preferably has a plurality of teeth of the same width and spacing as the teeth 18 of magnetic material in the platen 12. For example, the pole piece 28 may have a pair of teeth designated as "a" and "c" (FIG. 4) each of which has a width corresponding to the width of each of the teeth 18 and the grooves 16 in the platen 12. Alternatively, each of the pole faces on the pole pieces 28 and 30 may comprise a plurality of spaced teeth as illustrated in FIG. 3.

Figure 4A:
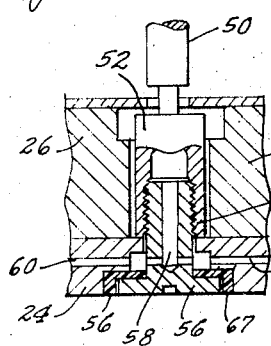
FIG. 4a is an enlarged fragmentary elevational view of a portion of the head shown in the previous figures.
Figure 4:
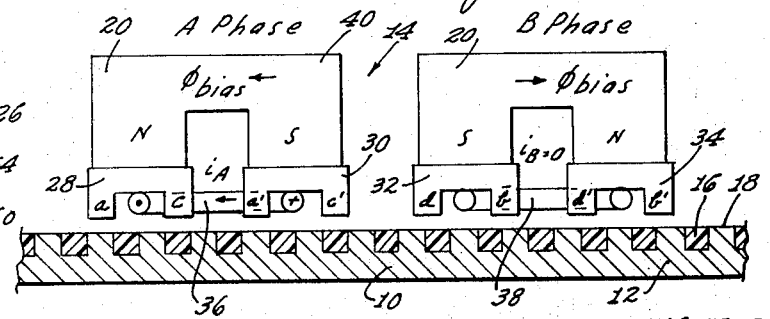
FIG. 4 is an enlarged fragmentary elevational view of portions of the head and platen shown in FIG. 1, with the platen being shown in section.

When the pole pieces 28 and 30 have the construction illustrated in FIG. 4, the teeth $a$ and $c$ are spaced such that, when one is over a tooth 18 of magnetic material on the platen 12, the other is over the groove 16 of non-magnetic material on the platen. In other words, the spacing between the centerlines of the teeth $a$ and $c$ may be $p(n \pm \frac{1}{2})$ where $n$ is any whole number and $p$ is the pitch of the grid on the platen 12 or the distance from a centerline of one groove or one tooth to the centerline of the next groove or tooth on the platen 12. The pole pieces 30, 32 and 34 are similarly constructed.

The pole piece 30 has magnetic teeth designated as $a$ and $c$. The pole pieces 28 and 30 of the magnet 40 are spaced so that the magnetic teeth $a$ and $a'$ have the same disposition relative to the grooves 16 and the teeth 18 and the magnetic teeth $c$ and $c'$ also have the same disposition relative to the grooves 16 and the teeth 18. In other words, the magnetic teeth $a$ and $a'$ are at magnetic teeth 18 at the same time and the magnetic teeth $c$ and $c'$ are at magnetic teeth 18 at the same time.

The magnet 44 is constructed in a manner similar to the magnet 40. The magnets 40 and 44 are spaced so that, when the teeth of one magnet are directly over a tooth 18 or a groove 16, the teeth of the other magnet are midway between a tooth 18 and a groove 16. Thus the centerlines of corresponding teeth of the magnets 40 and 44 are spaced $p(n \pm \frac{1}{4})$.

The two magnets of a set are designated the A-phase and B-phase magnets. In the preferred embodiment, using two parallel sets of magnets illustrated in FIG. 2, the magnets of one set such as the set 20 are arranged with the A-phase to the left and the B-phase to the right and the magnets of the other set such as the set 22 are arranged with the B-phase to the left and the A-phase to the right. This arrangement provides improved balancing forces on the driving means such as the head 14 and minimizes any tendency for the head 14 to rotate on an axis normal to the top surface of the platen 12. With this arrangement, the magnets of one set are spaced $p(n + \frac{1}{4})$ and the magnets of the other set are spaced $p(n - \frac{1}{4})$.

In FIG. 4, when the current in the winding 36 for the A-phase magnet 40 is at full strength, and flux produced by the current is added to the bias flux produced by the permanent magnet 40 in the pole faces $a$ and $a'$ and is subtracted from the bias flux produced by the magnet in the pole faces $c$ and $c'$ to reduce the flux in the pole faces $c$ and $c'$ to a value approximately zero. Since the teeth $a$ and $a'$ are directly over the teeth 18 in the platen 12, no force is produced by the teeth to move the head 14 along the platen 12. At this time, the current $i_B$ in the winding 38 for the magnet 44 is zero and the fluxes in the teeth $d$ and $b$ of the pole piece 32 and in the teeth $d'$ and $b'$ of the pole piece 34 are substantially identical. The magnitude of such fluxes may be one-half of that produced by the A-phase magnet through the teeth $a$ and $a'$ in FIG. 4 and is one-fourth of that produced in the teeth $a$ and $a'$ in FIG. 4 when the current $i_A$ flows through the winding 36. The $d$ and $d'$ teeth are angularly displaced from the $b$ and $b'$ teeth by 180° so that the net result is that the teeth $b$ and $b'$ and the teeth $d$ and $d'$ contribute no forces to move the head 14 along the platen 12. Under these conditions, the head 14 remains in the position of FIG. 4.

In order to step the head 14 to the right, the B-phase current is turned on with a polarity to cause the magnetic flux at $d$ and $d'$ to go to zero and the flux at $b$ and $b'$ to go to a maximum. When this occurs, a positive force is produced in the head 14 to move the head to the right in FIG. 4.

When the head 14 has advanced a quarter of a pitch, the B phase current may be turned off and the A-phase current may be turned on with a polarity opposite to that shown in FIG. 4. The head 14 will then move to the right through a distance corresponding to another one-fourth of a pitch so that the teeth $c$ and $c'$ will be positioned over the teeth 18 on the platen 12. For the next step, the A-phase current may be turned off and the B-phase current may be turned on with a polarity opposite to that described above. The next step is made by turning to the current shown in FIG. 4. Stepping in the opposite direction is achieved by switching currents in the opposite sequence.

Actually both of the windings 36 and 38 and the A-phase and B-phase magnets may be simultaneously energized. The signals applied to the windings 36 and 38 may be periodic signals having a quadrature relationship to each other. For example, sine signals may be applied to the winding 36 and cosine signals may be applied to the winding 38. When this occurs, the movement of the head 14 may be continuous rather than occurring in steps as described in the previous paragraph. The direction of movement of the head 14 along the platen 12 may be reversed by reversing the phase of one of the input signals such as the sine signal or by rotating the vectors of the input signals in the opposite direction.

The apparatus described above has certain important advantages. It provides a movement of the head 14 relative to the platen 12 in synchronism with the periodicity of the input signals applied to the windings 36 and 38. In other words, the head 14 moves through a distance corresponding to the pitch of the teeth 18 when the signals applied to the windings 36 and 38 have advanced through one cycle. Furthermore, the head can be accelerated and decelerated with a faster response time than in motors such as induction motors which are not synchronous.

The acceleration and deceleration of the head and the controlled movement of the head in synchronism with the periodicity of the input signal are also facilitated because there is no friction between the head and the platen during the movement of the head relative to the platen. Furthermore, since there is no friction between the head and platen, the head can be fairly light. This facilitates the rapid acceleration and deceleration of the head and further facilitates the movement of the head at a high speed from a first position to any desired position removed from the first position.

As will be appreciated, the head 14 carries an output member 38 such as a tool or a stylus. The various parts of the apparatus including the platen 12 and the head 14 are easily accessible and the output member 48 such as the tool or stylus can be easily viewed. Another advantage is that the head carries the output member 48 so that the positioning of the output member is directly related to the positioning of the head.

The apparatus described above also has certain other important advantages. Since the windings 36 and 38 receive periodic signals which are related to the displacement of the head relative to the platen, the displacement of the head along each coordinate axis can be determined at each instant by determining the number of cycles and fractions thereof of the periodic signals respectively applied to the windings 36 and 38. The displacement of the head along each coordinate axis can also be determined by providing magnetic pickoffs which move with the head past the teeth 18 and which produce a signal having a maximum amplitude during movement of the pickoffs past the teeth and which produce a signal having a minimum amplitude during movement of the pickoffs past the grooves 16. In this way, the pickoffs produce periodic signals where each periodic signal represents a displacement of the head through a distance corresponding to the pitch between adjacent teeth 18.

Figure 1:
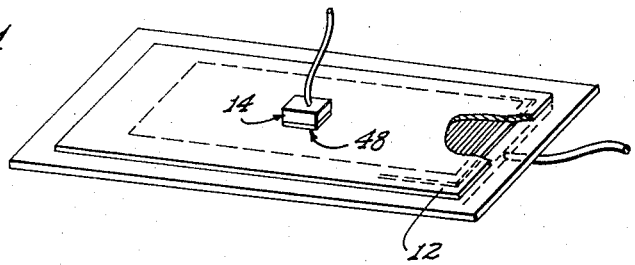
FIG. 1 is a perspective view of a synchronous motor and particularly a synchronous motor having a head movable along two coordinate axes relative to a platen.
Figure 2:
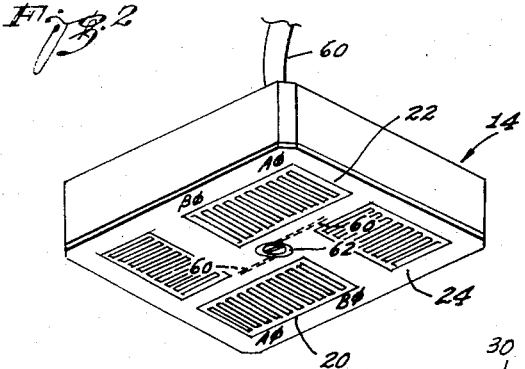
FIG. 2 is an enlarged perspective view of the head shown in FIG. 1.

As previously described, the head 14 is disposed in spaced but contiguous relationship to the platen 12. Various means including air bearings may be used to provide such spacing. For example, a control line 50 (FIG. 4a) may constitute a conduit for a supply of air under pressure. The air conduit of the control line terminates on a tube 52 held in place by a screw 54 positioned in an aperture 56. A passage 58 in the screw 54 provides communication with passages 60 radiating outwardly from the screw and terminating in outlet openings 62 (FIG. 2).

The linear synchronous motors described above provides a movement of one member such as the head relative to another member such as the platen along linear coordinate axes such as the $x$ and $y$ axes. It will be appreciated, however, that synchronous motors movable along other coordinates may also be used in the system constituting this invention without departing from the scope of the invention. For example, synchronous motors movable along polar coordinates and synchronous motors rotatable on a particular axis may also be used in the system constituting this invention without departing from the scope of the invention.

The fundamental equation for magnetic force in motors including synchronous motors operative on principles of variable reluctance is:

$$F = dw/dx, \quad (1)$$

where $F$ = magnetic force between the head 14 and the platen 12;
$w$ = magnetic field energy; and
$x$ = displacement of the head 14 relative to the platen 12 along the $x$-axis.

For magnetic devices employing soft iron circuits, it is known that $$F = \frac{1}{2} (MMF)^2 \, dP/dx, \quad (2)$$

where $MMF$ = the magnetomotive force between the head 14 and the platen 12;
$P$ = the magnetic permeance (the reciprocal of reluctance) between the head 14 and the platen 12.

From Equation 2, the force between the head 14 and the platen 12 may be derived for each individual axis. Thus, $$F_x = \frac{1}{2} (MMF)^2 \, dP/dx \quad (3)$$

where $F_x$ = force between the head and the platen along the $x$-axis.

$$F_y = \frac{1}{2} (MMF)^2 \, dP/dy, \quad (3a)$$

where $F_y$ = force between the head and the platen along the $y$-axis.

$$F_z = \frac{1}{2} (MMF)^2 \, dP/dx, \quad (3b)$$

where $F_z$ = force between the head and the platen along the $z$-axis, which is the axis normal to the platen 12.

When a tooth such as the tooth $a$ in the pole piece 28 moves relative to the platen, the permeance between the tooth and the platen varies in accordance with the following relationship:

$$P = P_o (1 + K \cos 2\pi x/p), \quad (4)$$

where $P_o$ = a constant
$K$ = a constant
$P$ = the pitch between adjacent teeth 18 on the platen 12.

Thus, $P = P_o + KP_o \cos 2\pi x/p$, where
$P_o$ = a bias term

Since each pole piece has two teeth spaced 180° apart (e.g., the teeth $a$ and $c$ on the pole piece 28 are spaced apart by 180°), the constant or bias term $P_o$ in Equation 4 is cancelled so that the tangential force for the A-phase magnet such as the magnet 20 may be designated as $$F_A = c_A i_A \cos 2\pi x/p, \quad (5)$$

where $F_A$ = the force between the magnet 20 and the platen along the $x$-axis;
$c_A$ = a constant; and
$i_A$ = the current through the winding 36.

Similarly, the force for the B-phase magnet such as the magnet 22 may be designated as $$F_B = c_B i_B \sin 2\pi x/p, \quad (5a)$$

where $F_B$ = the force between the magnet 22 and the platen along the $x$-axis;
$c_B$ = a constant; and $i_B$ = the current through the winding 38.

As previously described, the currents through the windings 36 and 38 have a periodicity related to the displacements between the head and the platen, or, in other words, to the force produced between the platen and the magnets associated with the respective windings. Thus, $i_A$ and $i_B$ can be expressed as trigonometric functions of $2\pi x/p$. If $i_A = I \cos 2\pi x/p$ and $i_B = I \sin 2\pi x/p$, $$F_A + F_B = cI (\cos^2 2\pi x/p + \sin^2 2\pi x/p = cI, \quad (6)$$

where $c$ = a constant
$I$ = the peak amplitude of the current through each of the windings 36 and 38.

The above discussion has proceeded on the basis that the phasor of the displacement of the head 14 relative to the platen 12 along each axis is displaced by 90° from the phasor of the input currents applied to the windings for that axis, such as the windings 36 and 38 for the x-axis. Actually, one of the features of this invention is to provide a controllable power angle between the vector of the displacement of the head relative to the platen at each instant and the vector of the resultant currents applied at that instant to the windings such as the windings 36 and 38 for the i-axis. This may be achieved by advancing or retarding through an angle $\theta$ the currents applied to the windings such as the windings 36 and 38. This causes the currents $i_A$ and $i_B$ to be actually expressed as:

$$i_A = I \cos (2\pi x/p + \theta) \quad (7)$$

$$i_B = I \sin (2\pi x/p + \theta) \quad (7a)$$

Under such circumstances, $$F_A + F_B = cI \sin \theta \quad (8)$$

As will be seen from the subsequent discussion, $\theta$ constitutes a controllable angle. The provision of the angle $\theta$ between the vector of the displacement of the head relative to the platen at each instant and the vector of the resultant currents applied at that instant to the windings such as the windings 36 and 38 for the x-axis causes a force to be produced for providing the displacement of the head relative to the platen. This facilitation occurs in a manner so that the actual displacement of the head relative to the platen at each instant corresponds closely to the desired displacement of the head relative to the platen at that instant.

The production of the power angle $\theta$ is illustrated in FIG. 5. In FIG. 5, the phasor of the displacement of the head 14 relative to the platen 12 along a particular axis such as the x-axis is indicated at 70. A quadrature component is introduced into the system and is illustrated at 72. This quadrature component is controllable in various ways which will be described in detail subsequently. The combination of the vectorial components 70 and 72 produces a vector 74 which represents the phasor of the signals applied to the windings such as the windings 36 and 38 for the x-axis. The angle $\theta$ between the vectors 70 and 74 represents the power angle between the input signals to the head and the positioning of the head at each instant.

The power angle may be considered as a spring producing a force corresponding to sine $\theta$. The spring may be considered as being applied between the head 14 and the platen 12 along a particular axis such as the x-axis. When the power angle may be considered as a spring, the spring becomes tensioned so as to produce a force on the head relative to the platen along the particular axis such as the x-axis in accordance with the spring tension. The resultant displacement of the head resets the spring if the power angle is not maintained by other means.

FIG. 6 provides a system representation of a synchronous motor which is operative in accordance with an open loop servo. The synchronous motor and attendant inertial load are illustrated in broken lines at 80. Input signals are applied to the motor through lines schematically illustrated as a line 82. In FIG. 6a the input signals may have a phase angle designated as A. The signals on the line 82 are shown schematically as being introduced to a differential 84.

The signals from the differential 84 are modified by a describing or transfer function illustrated schematically at 86 as being a part of the synchronous motor 80. The transfer or describing function 86 is represented as $D(A,jw)$, where $A$ represents the input signals on the line 82; $D$ represents a describing or transfer function; and $jw$ represents a frequency function of the periodic signals introduced to the line 82. The describing or transfer function 86 is actually non-linear but may be considered as a constant $K_m$ over a limited range of values.

The output represented by the describing or transfer function 86 actually constitutes a force which is applied to the head 14 to produce a displacement $x_o$ of the head along a particular axis such as the x-axis. The conversion of the force into the displacement $x_o$ is represented by a box 88 having a function $1/M_s 2$ where $M$ is the mass of the head and $1/s$ represents an integral of the acceleration imparted to the head by the force to produce a velocity of the head and $1/s^2$ represents a double integral of the acceleration to produce a displacement of the head. A line 90 is shown within the motor 80. This line 90 constitutes a mechanical feedback for resetting the spring providing the force represented by the power angle $\theta$ when the head moves.

The transfer function characteristic of the synchronous motor and head mass shown in FIG. 6 may be expressed as $G_h(s) = x_o(s)/A$ (9), which is a standard transfer function equation for servo systems as indicated on page 50 of "Control Engineering" by Gordon Murphy (published by Boston Technical Publishers, Inc. in 1965). In this equation, $A$ = the input signals to the synchronous motor 80 on a phasor basis;
$x_o$ = the actual displacement of the motor 80 relative to the platen on a phasor basis;
$s$ = a complex variable function; and
$G_h(s)$ = the ratio of the transfer function of the displacement of the motor relative to the input signals.

Equation 9 can also be expressed as follows in accordance with the discussion on page 50 of "Control Engineering" by Gordon Murphy $$G_h(s) = G(s)/1+G(s) \tag{10}$$

As previously described, the describing function $D(A,jw)$ constitutes a constant $K_m$ for a limited range of values. The function $G(s)$ may accordingly be written as $$G(s) = K_m/Ms^2, \tag{11}$$

where $K_m$ = a constant;
$M$ = the mass of the head;
$1/S^2$ = a double integral to convert an acceleration to a displacement.

Substituting Equation 11 in Equation 10

$$G_h(s) = K_m/Ms^2 / 1 + K_m/Ms^2 = 1/M/K_m\, s^2 + 1 \tag{12}$$

FIG. 7 illustrates one arrangement for providing a phasor angle rotator (hereinafter designated as "PAR") which is included in subsequent embodiments. A "phasor" may be considered as an instantaneous vectorial representation of a parameter such as input signals or the displacement of the head. It will be appreciated that other embodiments of a phasor angle rotator may be used without departing from the scope of the invention.

In the embodiment illustrated in FIG. 7, signals are provided on two lines 90 and 92 from a generator 94 such as a digital-to-analog resolver. The signal on the line 90 may be represented as $P$ cosine $\beta$ and the signal on the line 92 may be represented as $P$ sine $\beta$ to indicate a particular phase-displacement relationship such as a quadrature relationship between the signals on the lines 90 and 92. The signal on the line 90 is introduced to a stage 95 for converting the signal $P$ cosine $\beta$ to a signal ($-P$ cosine $\beta$) by multiplying the signal on the line 90 by a factor of $-1$. The signals from the stage 90 are introduced to a multiplier 96 which also receives signals having a variable amplitude from a terminal 98. These signals have a variable voltage and may constitute an independent variable and may be represented by a value $U$. The signals are produced between the terminal 98 and a terminal 99 connected to a suitable reference potential such as ground. The variable voltage $U$ is provided to control the power angle $\theta$ illustrated in FIG. 5.

The signals from the multiplier 96 may be represented as $UP$ cosine $\beta$ and are introduced to an adder 100 which also receives the signals $P$ sine $\beta$ from the line 92. The signals from the adder 100 are introduced to a terminal 102. Similarly, the signals from the line 92 are introduced to a multiplier 104 as are the signals $U$ produced between the terminals 98 and 99. The resultant signals from the multiplier 104 constitute $UP$ sine $\beta$. These signals are introduced to an adder 106 as are the signals on the line 90. The resultant signals from the adder 106 are introduced to a terminal 108.

The signals on the terminal 102 may be represented as $jP \sin \beta - UP \cos \beta$. Similarly, the signals on the terminal 108 may be represented as $P(\cos \beta + jU \sin \beta)$. The resultant signals between the terminals 108 and 102 may be represented as $$\overline{P}_o = P(\cos \beta + j \sin\beta) + UP(\sin\beta - j\cos\beta), \tag{13}$$

where $j = \sqrt{-1}$, which is used to represent the quadrature relationship of the signals on the line 92 relative to the signals on the line 90;
$\overline{P}_o$ = the vector of the signals produced between the terminals 108 and 102.

The operation of the PAR illustrated in FIG. 7 may be seen from FIG. 7a, where $\beta$ constitutes the angle at each instant of the signals provided on the lines 90 and 92 and $\delta$ represents the phase shift provided by the PAR shown in FIG. 7. In FIG. 7a, P constitutes the composite phase of the input signals on the lines 90 and 92 and UP represents the vector produced by the PAR. The resultant vector of the signals produced between the terminals 102 and 108 is illustrated as $P_o$. This vector is shifted by an angle $\delta$ from the vector of the signals produced on the lines 90 and 92. The signals $P_o$ may be represented as $$\overline{P}_o = \sqrt{1 + U^2}\, Pe\, j(\beta+\delta), \tag{14}$$

where $\sqrt{1 + U^2}$ is obtained because $P_o$ constitutes the hypotenuse of a right angle triangle formed by $\overline{P}$ and $\overline{UP}$.

As will be seen from FIG. 7a, the vector $\overline{P}_o$ has a variable amplitude depending upon the value of the signal U produced at each instant. This variation in the amplitude of the vectorial signal $\overline{P}_o$ is sometimes considered as undesirable since it may tend to saturate various input stages if the amplitude of the signal increases excessively. FIG. 8 illustrates a PAR which produces an output signal $\overline{P}_o$ having a constant amplitude. In the embodiment illustrated in FIG. 8, signals representing $P$ cosine $\beta$ and $P$ sine $\beta$ are respectively produced on the lines 90 and 92. The signals from the line 90 are multiplied by a factor of $-1$ in a stage 95 identical to the stage 95 in FIG. 7. The signals from the stage 95 are introduced to a stage 96 which is identical to the stage 96 in FIG. 7. Similarly, the stage 104 is identical to the stage 104 shown in FIG. 7. The stages 96 and 104 receive signals provided between the terminals 98 and 99 which are identical to the same terminals in FIG. 7.

The signals from the multiplier 96 are introduced to an adder 110 which also receives signals from a multiplier 112. The multiplier 112 multiplies the signals on the line 92 and the signals which are produced in a stage 116 from the signals U between the terminals 98 and 99. The signals produced in the stage 116 may be represented as $\sqrt{1-U^2}$. Similarly, a multiplier 114 multiplies the signals on the line 90 and the signals from the stage 116 and introduces these signals to an adder 118 for combination with the signals from the multiplier 104. The signals from the adders 110 and 118 are respectively introduced to terminals 120 and 122.

The signals $\overline{P}_o$ produced between the signals 120 and 122 have a constant amplitude as may be seen from FIG. 8a. In FIG. 8a, the signals $\overline{P}_o$ are illustrated as being produced from two quadrature vectors one having a value $\sqrt{1-U^2}\,\overline{P}$ and the other having a value $\overline{P}$. The resultant signals $\overline{P}_o$ may be expressed as $$\overline{P}_o = \overline{P}\sqrt{U^2 + (1 - U^2)} = \overline{P} \tag{15}$$

Since the signals $P_o$ produced by the PAR shown in FIG. 8 have a constant amplitude even with variations in the amplitude of the voltage U, they cannot saturate any input stages which control the operation of the synchronous motor.

FIG. 9 illustrates a block diagram of a system similar to that shown in FIG. 6 but including the addition of an acceleration input designated as $x_i(s)$. These signals are produced on a line 130 and are modified by a factor K and are introduced in modified form to an adder 132 for combination with signals from a line 134 representing a desired displacement $\ddot{x}_i(s)$. The signals from the adder 132 are introduced to the motor 80 also shown in FIG. 6. The motor 80 is represented as the function $$G_h(s) = 1/M/K_m\ S^2 + 1$$

in accordance with Equation 12 above. The displacements of the motor relative to the platen may be represented as $x_o(s)$.

The input A (s) to the motor 80 may be represented as $$A(s) = x_i + K\ddot{x}_i = (1 + Ks^2)\ x_i(s), \tag{16}$$

where $S^2$ = a double differential operator. Furthermore, as will be seen from FIG. 9, $$A(s)\ G_h(s) = x_o \tag{17}$$

Substituting the values for $G_h(s)$ and $A(s)$ in Equation 17, $$(1 + Ks^2)\ x_i(s)\ 1/Ms^2/K_m + 1 = x_o(s)\ x_o(s)/x_i(s) = Ks^2 + 1/M/k_m s^2 + 1 \tag{18}$$

It will be seen from Equation 18 that the output displacement $x_o(s)$ of the head approaches the desired displacement $x_i(s)$ introduced to the head as the value of K approaches the value of $M/K_m$. As will be appreciated, it is desirable for the output displacement at each instant to approach or equal the desired input displacement at that instant. There are accordingly advantages to providing the input on the line 130 in FIG. 9 to represent the desired allowable acceleration of the head at each instant. This advantage results from the fact that adjustments in the modifying factor K for the desired displacement provide a flexibility in the operation of the synchronous motor since it causes the actual displacement of the head to approach the desired displacement of the head when the modifying factor K is adjusted optimally relative to the value of $M/K_m$. However, the open loop system shown in FIG. 9 may present problems in providing an actual displacement corresponding to the desired displacement if perfect conditions do not prevail. For example, if the head in the synchronous motor should start to oscillate, no provision is made in the system shown in FIG. 9 for damping such oscillations. As will be appreciated, oscillations may occur from a number of factors including any disturbances which are imparted to the head.

FIG. 9a illustrates on a schematic basis a digital system corresponding to the open loop servo system shown in FIG. 9. The system shown in FIG. 9a corresponds on a simplified block diagram basis to the system disclosed in detail and claimed in copending application Ser. No. 36,177 filed by me on May 11, 1970, for a "CONTROL SYSTEM FOR MAGNETIC POSITIONING DEVICE." The system includes a line 140 for receiving digital signals representing increments in the desired displacement $x_i(s)$ and signals on a line 142 representing increments in the desired acceleration of the head. The signals on the line 142 are modified by the factor K and are introduced to a digital adder 144 for combination with the signals from the line 140. The signals are then introduced to a digital-to-analog resolver 146 which produces a pair of quadrature signals such as cosine and sine signals representing the input signals to the synchronous motor.

FIG. 9b illustrates on a schematic block diagram basis an analog version of the system shown in FIG. 9. In the embodiment shown in FIG. 9b, digital signals representing increments in a desired displacement $x_i$ are introduced to a digital-analog resolver 148 and digital signals representing increments in the desired acceleration $\ddot{x}_i$ are introduced to a digital-analog converter 150. The signals from the converter 150 are modified by the factor K in a stage 152 and are introduced to a PAR 154 as are the signals from the resolver 148. The PAR 154 may be constructed in a manner similar to that illustrated in FIGS. 7 and 8 and disclosed above in detail.

FIG. 10 illustrates a system including a closed loop servo for providing an improved control. In the system of FIG. 10, signals representing the desired displacement $x_i(s)$ are provided on a line 160 and signals representing the desired acceleration $\ddot{x}_i(s)$ are provided on a line 162. The signals on the line 162 are modified by the factor K in a stage 164 and are introduced to a differential or comparator 166, the term "differential" being considered in this application as comparable to term "comparator." The signals from the differential 166 are introduced to a stage such as an adder or a PAR 168 (see FIGS. 7 and 8) for combination with the signals $x_i(s)$ on the line 160.

The signals from the adder or PAR 168 pass to a synchronous motor 170 similar to the synchronous motors described above. The resultant displacement of the movable member such as the head relative to the stationary member such as the platen in the synchronous motor are detected to provide signals representing the displacment $x_o(s)$. The signals representing the displacement $x_o(s)$ of the movable member such as the head are provided on a line 172 and are differentiated twice (as indicated at "$s^2$" in FIG. 10) to provide signals representing the actual acceleration $\ddot{x}_o(s)$ of the movable member such as the head relative to the stationary member such as the platen. Alternatively, an accelerometer may be disposed on the head to provide directly signals representing the actual acceleration $\ddot{x}_o(s)$ of the movable member such as the head relative to the stationary member such as the platen. The acceleration signals are then modified by a factor $K_o$ and are then introduced to the differential 166. The differential 166 operates to introduce to the stage such as the PAR 168 signals representing the difference between the desired acceleration $\ddot{x}_i(s)$ and the actual acceleration $\ddot{x}_o(s)$. These difference signals constitute error signals which control the power angle provided by the stage such as the adder or PAR 168.

The input $A(s)$ to the motor may be represented as $$A(s) = x_i(s) + K\ddot{x}_i(s) - K_o\ddot{x}_o \quad (19)$$

This equation may be rewritten as $$A(s) = x_i(s) + Ks^2 x_i(s) - K_o s^2 x_o \quad (19a)$$

Since $A(s) = x_o(s)/G_h(s)$ in accordance with Equation 17, $$x_o(s)/G_h(s) = (Ks^2+1)x_i - K_o s^2 x_o \quad (19b)$$

Therefore, by transposing terms $$(K_o s^2 + 1/G_h(s))x_o(s) = (K_s 2+1)x_i(s) \quad (19c)$$

By substituting the value expressed above in Equation 12 for $G_h(s)$, $$x_o(s)/x_i(s) = Ks^2+1/K_o s^2 + (M/k_m s^2+1 = Ks^2+1/(M/k_m+k_o)s^2 + 1 \quad (20)$$

As will be seen by comparing Equations 20 and 18, the term $K_o$ is added in the denominator by feeding the acceleration signals $\ddot{x}_o(s)$ back to the stage such as the PAR 168. By including the term $K_o$, the resonant frequency of the mass represented by the head is decreased since the virtual mass of the head is effectively increased. Reductions in the resonant frequency of the head are desirable since they tend to occur at frequencies that are lower than the usual disturbances that are imposed upon the head. Furthermore, by including the term $K_o$, the flexibility in the system for controlling the operation of the synchronous motor 170 is enhanced so that the actual displacements $x_o(s)$ of the head can approach the desired displacements $x_i(s)$ of the head. As previously indicated for the embodiment shown in FIG. 9, the inclusion of an additional term such as the term $K_o$ causes the actual displacement $x_o(s)$ of the head to approach the desired displacemtne $x_i(s)$ of the head under ideal conditions such as occur when disturbances are not imparted to the head.

FIG. 11 provides a system including a closed loop for feeding signals representing velocity back to the input to a synchronous motor 180. In the embodiment shown in FIG. 11, signals representing a desired displacement $x_i(s)$ are introduced through a line 182 to an adder 184. The adder 184 may also receive signals representing a desired acceleration $\ddot{x}_i$ from a line 186, these signals being modified by a factor $K$ in a stage 188.

The signals from the adder 184 are introduced to a stage such as a PAR 190 as are the signals from a differential 192. The differential 192 receives signals which are provided on a line 194 to represent a desired velocity $\dot{x}_i$ of the movable member such as the head relative to the stationary member such as the platen, these signals being modified by a factor $f$ in a stage 196. The differential 192 also receives signals which are provided on a line 200 to represent the actual velocity $\dot{x}_o$ of the movable member such as the head at each instant. Alternatively, an accelerometer may be disposed on the head to produce signals representing the actual acceleration $\ddot{x}_o$ of the head and these signals may be integrated to produce signals representing the actual velocity $\dot{x}_o$ of the head.

The signals on the line 200 may be provided by producing on a line 202 signals representing the actual displacement $x_o$ of the movable member such as the head at each instant. These signals are differentiated in a stage 204 to produce signals representing the actual velocity $\dot{x}_o$ of the movable member such as the head and the signals representing the actual velocity are modified in a stage 206 by a factor $f_o$.

The signals $A(s)$ introduced to the synchronous motor 180 in FIG. 11 may be represented as $$A(s) = x_i(s) + K\ddot{x}_i(s) + f\dot{x}_i - f_o\dot{x}_o \quad (21)$$

Equation 21 may be rewritten as $$A(s) = x_i + Ks^2 x_i + fsx_i - f_o s x_o \quad (21a)$$

Regrouping the terms in Equation 21a, $$A(s) = (Ks^2 + fs + 1)x_i - f_o s x_o \quad (21b)$$

Since $A(s) = x_o(s)/G_h(s)$ in accordance with Equation 17, $$(f_o s + 1/G_h(s))x_o = (Ks^2 + fs + 1)x_i \quad (21c)$$

Therefore $x_o(s)/x_i = Ks^2 + fs + 1/M/k_m s^2 + f_o s + 1$

The system shown in FIG. 11 can be made stable under all conditions including such conditions as external disturbances and imperfect elements in the motor. The system accomplishes such stability by feeding back to the input to the motor signals representing the actual velocity $\dot{x}_o$ of the movable member such as the head. Signals representing the desired velocity $\dot{x}_i$ of the movable member such as the head may also be introduced to the differential 192 with the signals representing the actual velocity $\dot{x}_o$ of the head so that the output from the differential 192 represents the differences in the desired and actual velocities. These differences constitute errors such as oscillations of the movable member such as the head. The errors are introduced to the stage such as the PAR 190 in a direction to eliminate the errors. By introducing these error signals to the PAR 190, the differential 192 controls the power angle $\theta$ provided by the PAR. In this way, the system shown in FIG. 11 tends to damp any oscillations on the movable member such as the head.

The embodiment shown in FIG. 12 is similar to the embodiment shown in FIG. 11 except that it includes an additional feedback path for the signals $x_o$ representing the displacement of the movable member such as the head relative to the stationary member such as the platen. These signals are produced on the line 202 and are fed back to a differential 210 for combination with the signals $x_i(s)$ representing the desired displacement of the movable member such as the head relative to the stationary member such as the platen. The resultant signals produced by the differential 210 represent errors in the displacement of the movable member such as the head. These signals are modified in a stage 212 by a factor $K_e$ and are introduced to an adder 214 for combination with the signals from the adder 184. The resultant signals are introduced to the stage 190 which may be an adder or a PAR as previously explained.

The signals $A(s)$ introduced to the motor 180 in FIG. 12 may be defined as $$A(s) = x_i(s) + k\ddot{x}_i(s) + f\dot{x}_i - f_o\dot{x}_o + k_e x_i - k_e x_o \quad (22)$$

Equation 22 may be rewritten as $$A(s) = x_i + ks^2 x_i + fs x_i - f_o s x_o + k_e x_i - k_e x_o \quad (22a)$$

Regrouping the terms in Equation 22, $$A(s) = (Ks^2 + fs + ke + 1) x_i - (f_o s + K_e) x_o$$

Since $A(s) = x_o(s)/G_h(s)$ in accordance with Equation 17, $$x_o/G_h(s) + (f_o s + K_e) x_o = (Ks^2 + fs + K_e + 1) x_i \quad (22b)$$

Therefore, substituting for $G_h(s)$ in accordance with Equation 12, $$(f_o s + K_e + M/K_m s^2 + 1)x_o = (Ks^2 + fs + K_e + 1) x_i \quad (22c)$$

$$x_o/x_i = Ks^2 + fs + K_e + 1/M/K_m s^2 + f_o s + K_e + 1 \quad (22d)$$

The system shown in FIG. 12 provides a somewhat enhanced flexibility in operation relative to the system shown in FIG. 11. This results from the fact that Equation 22d is similar to Equation 21c except for the inclusion of the term "$K_e$" in the denominator and numerator of Equation 12. By including the term "$K_2$" in the denominator and numerator of Equation 22d, a proper selection may be made for the value $K_e$ so that the actual displacement $x_o$ of the movable member such as the head approaches the desired displacement $x_i$ of the head under different operating conditions. For example, by including the term $K_e$ in the denominator and numerator of Equation 12, additional terms are provided whose value may be adjusted to provide closed loop stability.

FIGS. 13a to 13g, inclusive, show various systems for providing velocity feedback in a closed loop to produce damping in the displacement of the movable member such as the head. The systems shown in FIGS. 13a to 13g, inclusive, represent various types of digital and analog systems which provide closed loops for feeding back signals representing a function of the actual velocities of the movable member such as the head at each instant. The systems shown in FIGS. 13a to 13g, inclusive, may also introduce signals representing functions of desired and actual velocities of the head to a differential to obtain signals representing the differences between these functions. The systems shown in FIGS. 13a to 13g, inclusive, may further introduce various combinations of desired displacement, desired velocity and desired acceleration to the synchronous motor to control the power angle of the motor. The systems shown in FIGS. 13a to 13g, may produce the signals representing functions of the actual velocities of the movable member such as the head by producing signals $\ddot{x}_o$ representing the actual acceleration of the head and integrating such signals once to produce signals representing the actual velocity $\dot{x}_o$ or by integrating such signals twice to produce signals representing the actual displacement $x_o$.

In the embodiment shown in FIG. 13a, a digital system is provided for introducing on a digital basis increments in a desired displacement $x_i$, increments in a desired acceleration $K\ddot{x}_i$ and increments in a desired velocity $f\dot{x}_i$ to the synchronous motor and in particular to the movable member such as the head of the motor. The digital signals representing increments in $x_i$ and $K\ddot{x}_i$ are combined in an adder 220. The signals representing increments in the desired velocity $f\dot{x}_i$ are combined in a differential 222 with the signals representing increments in the actual velocity $f_o\dot{x}_o$ to produce signals representing increments in the error of the actual velocity relative to the desired velocity of the movable member such as the head. These error signals are introduced through a line 224 to an adder 226 for combination with the signals from the adder 220. The resultant signals are introduced to a digital-to-analog resolver 228 which produces analog signals for introduction to the synchronous motor.

In the embodiment shown in FIG. 13b, only signals representing digital increments in the desired displacement $x_i$ and in the desired acceleration $\ddot{x}_i$ of the movable member such as the head are provided. The signals representing the desired acceleration $\ddot{x}_i$ are modified by a factor $k$ and are introduced to an adder 230 for combination with the signals representing increments in the desired displacement $x_i$ of the movable member such as the head.

The signals representing increments in the desired acceleration $\ddot{x}_i$ are also introduced to a differential 232 for combination with signals representing increments in the actual acceleration $\ddot{x}_o$ of the movable member such as the head. The resultant signals produced by the differential 232 represent increments in the error between the desired and actual accelerations of the movable member such as the head. These error signals are integrated by a stage 234 and the integrated signals are modified by a factor $f$ and introduced to an adder 236 for combination with the signals from the adder 230. The resultant signals from the adder 236 are introduced to a digital-to-analog resolver 238 which converts the digital signals to an analog signal for introduction to the synchronous motor.

The embodiment shown in FIG. 13c illustrates a system which is partially digital and partially analog. Digital signals representing increments in the desired displacement $x_i$ and in the desired acceleration $\ddot{x}_i$ of the movable member such as the head are introduced to an adder 240, the digital signals representing $\ddot{x}_i$ being modified by a factor $k$. Ths signals from the adder 240 are introduced to a digital-to-analog resolver 242 to convert the signals to an analog form. The analog signals from the resolver 242 are then introduced to a stage such as a PAR 244 for controlling the power angle $\theta$. These signals are then introduced to the synchronous motor to provide the displacement of the movable member such as the head relative to the stationary member such as the platen.

Analog signals designated as $\dot{x}_o$ are then provided from the movable member such as the head to indicate the velocity of the movable member and these signals are modified by the factor $f_o$ and introduced to a differential 246. The signals are combined in the differential 246 with signals $f\dot{x}_i$ representing the desired velocity of the whose member such as the head relative to the stationary member such as the platen. The signals from the differential 246 constitute error signals representing the differences between the desired and actual velocities of the movable member such as the head. These signals are introduced to the PAR 244 to control part of the power angle of the signals provided by the PAR and damp the movements of the head.

The system shown in FIG. 13d constitutes a modification of the system shown in FIG. 13c. In the system shown in FIG. 13d, the digital signals representing $\ddot{x}_i$ are introduced to a digital-to-analog converter 250 for conversion to analog form and are then introduced as analog signals to a differential 252. These signals are then combined in the differential 252 with analog signals $\ddot{x}_o$ representing the acceleration of the movable member such as the head relative to the stationary member such as the platen. The error signals from the differential 252 are then integrated by a stage 254 to provide signals representing the difference between the desired and actual velocities of the movable member such as the head. The error signals from the stage 254 are modified by a factor $f_o$ and are introduced to a stage such as a PAR 256 for providing a controllable power angle. The PAR 256 corresponds to the PAR 244 in FIG. 13c.

The embodiment shown in FIG. 13e also operates partially in a digital form and partially in an analog form. In the embodiment shown in FIG. 13e, digital signals $x_i$ representing increments in a desired displacement of the movable member such as the head are introduced to a digital-to-analog resolver 260 for conversion to analog form and then introduced in an analog form to a stage such as a PAR 262 for controlling the power angle $\theta$. Digital signals $\ddot{x}_i$ representing increments in the desired acceleration of the movable member such as the head are converted to an analog form by a stage 264 and are then compared in a differential 266 with signals $\ddot{x}_o$ representing the actual acceleration of the movable member such as the head relative to the platen. The resultant signals representing errors in acceleration are converted to signals representing error in velocity and are introduced through an adder 268 to the PAR 262 in a manner similar to that discussed above for the embodiment shown in FIG. 13d. The signals representing the desired acceleration are also modified by a factor $k$ and are introduced to the PAR 262 through the adder 268.

The system shown in FIG. 13f constitutes a system operating completely in analog form. In this sytem, analog signals representing the desired displacement $x_i$ are introduced directly to a stage such as a PAR 270 for providing the power angle $\theta$. Similarly, analog signals representing the desired acceleration $\ddot{x}_i$ of the movable member such as the head are introduced directly to a differential 274 and are modified by the factor $k$ and introduced to an adder 176. The signals from the differential 274 are integrated and introduced to the adder 276. In all other respects, the system shown in FIG. 13f is substantially identical to the system shown in FIG. 13e.

The embodiment shown in FIG. 13g also operates completely in analog form. In this embodiment, analog signals representing the desired displacement $x_i$ of the movable member such as the head are introduced to a stage 280 such as a PAR for controlling the power angle $\theta$. Analog signals representing the desired velocity $\dot{x}_i$ of the movable member such as the head are modified by a factor f and are introduced to a differential 282 as are analog signals representing the actual velocity $\dot{x}_o$ of the movable member such as the head after these signals have been modified by a factor $f_o$. The error signals from the differential 282 are introduced to an adder 284 for combination with signals representing a desired acceleration $\ddot{x}_i$ of the movable member such as the head, these signals being modified by a factor $k$. The signals from the adder 284 are introduced to the PAR 280 to control the power angle provided by the PAR.

FIG. 14 shows a system for controlling the movable member such as a head relative to a stationary member such as a platen along a pair of coordinate axes such as $x$ and $y$ axes. The system shown in FIG. 14 also operates to damp the rotation of the head relative to the platen about an axis substantially normal to the surface defined by the $x$ and $y$ axes. In the system shown in FIG. 14, a pair of digital signals respectively representing positive or negative increments in a desired displacement $x_i$ of the movable member such as the head are provided on lines 300 and 302. These signals are converted by digital-to-analog resolver 304 to analog signals representing the desired displacement of the head along the $x$-axis. The signals provided by the resolver 304 have a phase-displaced relationship such as a sine and cosine relationship. These signals are introduced to a pair of PARS 306 and 308.

Digital signals representing increments in the desired acceleration $\ddot{x}_i$ of the movable member such as the head along the $x$-axis are also provided on a line 310 and are converted to analog form by a digital-to-analog converter 312. The signals from the converter 312 may be integrated by a stage 314 to provide analog signals representing the desired velocity $\dot{x}_i$ of the movable member such as the head along the $x$-axis. As an alternative, digital signals representing increments in the desired velocity $\dot{x}_i$ may be provided on a line 316 and converted to analog form by a converter 318. The signals from the converter 318 or the signals from the integrator 314 are introduced to an adder 320 for combination with the signals representing the desired acceleration from the converter 312.

The signals from the adder 320 pass to a differential 322, the output of which is modified by a factor $k$. The signals are then introduced to a gate 323. The signals passing through the gate 323 are introduced to a capacitor 324 for charging the capacitor. The capacitor 324 provides a signal having an analog value which constitutes a bias for the signals passing through a differential 326. These signals are produced by an accelerometer 328 carried by a head 330 to indicate the acceleration of the head relative to the platen along the $x$-axis. The bias produced by the capacitor 324 in the differential 326 compensates for any offset errors in the signals produced by the accelerometer 328 as a result of the disposition of the platen in other than a horizontal plane.

The signals from the accelerometer 328 are modified by a factor $k$ in a stage 332 and are introduced to the differential 326, which cancels the bias component of the accelerometer signals by subtracting it out. This is the function of the voltage level on capacitor 324. The signals passing through the diffrential 326 are integrated as at 334 and are introduced to the differential 322 to control the amplitude of the signals passing through the differential. The signals from the differential 322 pass to an adder 336 and a differential 338.

Stages are provided for the y-axis corresponding to the stages provided for the x-axis. These stages include a pair of PARS 340 and 342, respectively, corresponding to the PARS 306 and 308. The signals from the PARS 340 and 342 are respectively introduced to the windings for driving means 341 and 343 (through drivers) corresponding to the driving means 20 and 22 in FIG. 2. These driving means 341 and 343 are provided for displacing the head relative to the platen along the y-axis. The stages for the y-axis further include an adder 344 and a differential 346 respectively corresponding to the adder 336 and the differential 338 for the x-axis.

A pair of accelerometers 348 and 350 are provided at opposite ends of the head 330 to sense the acceleration of the head relative to the platen along the y-axis. As will be appreciated, the signals provided by the accelerometers 348 and 350 will have equal amplitudes if the opposite ends of the head 330 accelerate at the same rate along the y-axis. However, if the head 330 tends to rotate relative to the platen about an axis substantially normal to the surface defined by the x and y axes, the accelerometer 348 will provide different signals than the accelerometer 350. The difference in the signals provided by the accelerometers 348 and 350 represents the rotary acceleration of the head relative to the platen about an axis substantially normal to the surface defined by the x and y axes.

The signals from the accelerometers 348 and 350 are respectively modified by the factor $k$ and are introduced to an adder 352 which adds the signals to provide signals constituting the average of the signals from the accelerometers 348 and 350 and representing the acceleration of the head relative to the platen along the y-axis. The signals from the adder 352 pass to a differential 354 corresponding to the differential 326 for the x-axis. The differential 354 also receives signals from an offset correction loop corresponding to the correction loop provided by the gate 323, the capacitor 324 and the differential 326 for the x-axis.

The offset correction loop for the y-axis, x-axis and rotation axis includes a gate 356 which receives signals from an inverting amplifier 358. The inverting amplifier 358 in turn receives from the computer a logic signal having a low amplitude which provides for the stationary disposition of the head relative to the platen and having a high amplitude when movement of the head is commanded. Since these signals are inverted by the amplifier 358, the gate 356 closes to pass signals only during the time that the computer provides for the stationary disposition of the head. When the gate 356 closes, a signal representing the gravity component and other acceleration offsets pass through the gate from a differential 360 and charge a capacitor 361.

In this way, the offset correction loop produces a signal having a bias, during each movement of the head relative to the platen, corresponding to that produced in the loop during the last time that the head has been stationary. By including the offset correction loop to provide a bias signal for the differential 354, the signals passing through the differential 354 represent only the actual acceleration of the head relative to the platen. In this way, any errors produced in the signals as a result of a disposition of the platen in other than a horizontal relationship are eliminated.

The signals from the accelerometers 348 and 350 are also introduced to a differential 362 which operates to pass the differences in the amplitude levels of the two acceleration signals. This difference in amplitude represents the component of the acceleration resulting from the rotation of the head relative to the platen about an axis substantially normal to the surface defined by the x and y axes. The signal from the differential 362 passes to an offset correction loop 364 which compensates in a manner similar to that described above for stages including the gate 323 and the capacitor 324 for any errors resulting from the disposition of the platen in other than a horizontal plane.

The resultant accelerometer signals passing through the offset correction loop 364 are integrated as at 366 to provide signals representing the rotational velocity of the head relative to the platen about an axis substantially normal to the surface defined by the x and y axes. The signals from the integrator 366 are then introduced to the adder 336 and the differential 338. The signals from the integrator 366 are added in the adder 336 to the signals provided by the differential 322 and are subtracted in the differential 338 from the signals provided by the differential 322.

The signals from the adder 336 are then introduced to the PAR 306 to control the power angle $\theta$ provided by the PAR 306, and the signals from the differential 338 are correspondingly introduced to the PAR 308 to control the power angle of the signals provided by the PAR 308.

In this way, the power angles of the signals provided by the PARS 306 and 308 are controlled to inhibit any rotation of the head relative to the platen about the axis substantially normal to the surface defined by the x and y axes. Similar controls are provided for the power angles of the signals from the PARS 340 and 342 for the y-axis to further inhibit the rotation of the head relative to the platen about the axis substantially normal to the surface defined by the x and y axes.

FIG. 15 illustrates a damping system using an inductor tachometer for enhancing the control of the displacement of a movable member such as a head relative to a stationary member such as a platen by damping the movements of the head along the x and y axes and by inhibiting any rotation of the head about an axis normal to the surface defined by the x and y axes. The system shown in FIG. 15 includes digital-to-analog resolvers 400 and 402 for converting digital signals representing increments in the desired displacements of the head relative to the platen in the x and y axes into analog signals representing such desired displacements along the x and y axes. The system shown in FIG. 15 also includes an adder 404 corresponding to the adder 320 in FIG. 14 for producing signals representing the desired velocity $\dot{x}_t$ along the x-axis and the desired acceleration $\ddot{x}_t$ along the x-axis. The system further includes an adder 406 for producing signals representing the desired velocity $\dot{y}_t$ along the y-axis and the desired acceleration $\ddot{y}_t$ along the y-axis.

The signals from the resolver 400 are introduced to PARS 408 and 410 which produce the controllable power angle $\theta$ for respectively controlling the forces applied to driving members 412 and 414 to produce a displacement of the head relative to the platen along the x-axis. Similarly, the signals from the resolver 402 are introduced to PARS 416 and 418 which produce the controllable power angle $\theta$ for respectively controlling the driving forces applied by driving members 419 and 420 to produce a displacement of the head relative to the platen along the y-axis.

The velocity of the head relative to the platen along the y-axis is detected by inductor tachometers 422 and 424. The construction of the inductor tachometers 422 and 424 is illustrated in FIG. 16 and will be described in detail subsequently.

The signals from the tachometer 422 may be displaced in phase and may be provided with the following relationships:

$$e_A = E_o \cos 2 \pi y/p \, dy_o/dt \quad (23)$$

$$e_B = E_o \sin 2 \pi y/p \, dy_o/dt, \quad (23a)$$

where, $e_A$ = a first signal from the tachometer 422;
$e_B$ = a second signal from the tachometer;
$p$ = the pitch of the teeth in the platen;
$y_o$ = the displacement of the head relative to the platen along the y-axis; and
$E_o$ = the maximum voltage produced by the tachometer.

The signals from the tachometer 422 pass to a trigonometric-eliminator-tachometer 430 which operates to eliminate the trigonometric function from the voltages $e_A$ and $e_B$ expressed in Equation 23. Elimination of these trigonometric functions cosine $2\pi/p$ and sine $2\pi/p$ is important to obtain a voltage proportional only to velocity. The construction and operation of the trigonometric-eliminator-tachometer (hereinafter designated as "TET") 430 will be described in detail subsequently in connection with the embodiment shown in FIG. 17. The TET 430 operates to eliminate the trigonometric function by combining the signals from the tachometer 422 with the signals representing the desired displacement $y_i$ from the resolver 402. In like manner, a TET 432 eliminates the trigonometric function from the signals provided by the tachometer 424.

The signals from the TETS 430 and 432 are added in an adder 434 to provide signals representing the velocity of the head relative to the platen along the y-axis. These signals are modified by a compensating network 436 for enhancing servo stability. The resultant signals are introduced to a differential 438 which operates to pass the signals representing the error between the desired and actual velocities of the head relative to the platen along the y-axis. The signals from the differential 438 then pass to an adder 440 and a differential 442.

The signals from the TETS 430 and 432 also pass to a differential 444 which produces signals representing the differences between the signals from the TETS. These difference signals represent the velocity of rotation of the head relative to the platen about an axis substantially normal to the surface defined by the x and y axes. These difference signals are compensated to enhance servo stability and are introduced to the adder 440 and the differential 442. In this way, the signals representing the velocity of rotation of the head are added in the adder 440 with the signals representing the error in the velocity of the head relative to the platen along the y-axis and are subtracted in the differential 442 from the signals representing the error in the velocity of the head relative to the platen along the y-axis.

The resultant signals provided by the adder 440 and the differential 442 are respectively introduced to the PARS 416 and 418 from the adder 440 and the differential 442. These signals provide corrections to damp any rotational oscillations of the head relative to the platen about the axis substantially normal to the surface defined by the x and y axes. Signals are also introduced to the PARS 408 and 410 for the x-axis from an adder 456 and a differential 448 to further control the rotation of the head relative to the platen about an axis normal to the surface defined by the x and y axes.

FIG. 16 illustrates one embodiment of the inductor tachometers 442 and 424 shown in FIG. 15. In the embodiment shown in FIG. 16, the platen 12 is provided with grooves 16 and teeth 18 in a manner similar to that illustrated in FIG. 4. The tachometer is provided with a pair of magnets 480 and 482 bridged by a permanent magnet 484. The magnet 480 is provided with a pair of teeth 486 and 488 separated from each other by a distance $p(n \pm \frac{1}{2})$. Similarly, the magnet 482 is provided with a pair of teeth 490 and 492 separated from each other by a distance $p(n \pm \frac{1}{2})$. The distance between the teeth on the magnet 480 and the teeth on the magnet 482 may be expressed as $p(n \pm \frac{1}{4})$.

Windings 493 and 494 are respectively provided on the teeth 486 and 488 and are differentially connected in series to produce the voltage $e_A$ specified in equation 23. Similarly, windings 495 and 496 are respectively provided on the teeth 490 and 492 and are differentially connected in series to produce the voltage $e_B$ specified in Equation 23a. The voltages $e_A$ and $e_B$ are induced in the windings as the head is displaced relative to the platen along the x-axis. The voltage $e_A$ may be expressed as $$e_A = E_o \cos 2 \pi/p \, y_o \, dy_o/dt,$$

where $E_o$ = the maximum voltage induced in the windings 493 and 494. Similarly, the voltage $e_B$ may be expressed as $$e_B = E_o \sin 2 \pi y_o/p \, dy_o/dt$$

An embodiment of TET (trigonometric eliminator tachometer) is shown in FIG. 17. As previously described in connection with the system shown in FIG. 15, the inductor tachometers such as the tachometers 422 and 424 produce a pair of signals which may be represented as $E_o$ cosine $2 \pi/p \, yo \, dy_o/dt$ and $E_o$ sine $2 \pi/p \, y_o \, dy_o/dt$. The signals provided by the resolver 402 may be represented as $E$ cosine $2 \pi \, y_i/p$ and $E \sin 2 \pi \, y_i/p$ where $E$ is a constant. The cosine signal from the tachometer such as the tachometer 422 and from the resolver 402 are introduced to a multiplier 500 and the sine signals from the tachometer and from the resolver are introduced to a multiplier 502. The signals from the multipliers 500 and 502 are added in an adder 504 to produce the output signals from the TET. The multipliers 500 and 502 and the adder 504 constitute a TET such as the TET 430 in FIG. 15.

The operation of the TET 430 may be seen from the following mathematical analysis. The multiplier 500 operates to provide signals which may be designated as $$I_o E \, dy_o/dt \, (\cos 2\pi y_o/p)(\cos 2\pi y_i/p) \quad (24)$$

Similarly, the multiplier 502 operates to produce signals which may be designated as $$E_o E \, dy_o/dt \, (\sin 2\pi y_o/p)(\sin 2\pi Y_i/p) \quad (24a)$$

However, $y_i$ may be expressed as $$2\pi Y_i/p = 2\pi Y_o/p + \alpha, \quad (25)$$

where $\alpha$ = the difference between the desired and actual displacements of the head relative to the palten along the y-axis. The output from the adder 504 may be accordingly expressed as $$T_e = E_o E \, dy_o/dt \cos 2\pi Y_o/p \cos(2\pi y_o/p + \alpha) + E E_o \, dy_o/dt \sin 2\pi y_o/p \sin(2\pi y_o/p + \alpha), \quad (26)$$

where $T_e$ = the output from the adder 504. It is well known in trigonometry that $$\cos A \cos B + \sin A \sin B = \cos(A-B) \quad (27)$$

If $A$ is considered as $2\pi y_o$ and $B$ is considered as $(y_o + \alpha)2\pi$, $$T_o = E_o E \, dy_o/dt \cos[2\pi y_o/p - (2\pi y_o/p + \alpha)] \quad (28)$$

Therefore, $T_o = E_o E \, dy_o/dt \cos(-\alpha) \approx E_o E \, dy_o/dt$ (28a)

since $\cos \alpha \approx 1$ because $\alpha$ is held to small values. It will accordingly be seen that the TET 430 provides an output which eliminates any trigonometric function of $y_o$.

FIG. 18 shows a system which provides an enhanced performance by feeding back digital signals representing increments in the actual velocity of the head relative to the platen. The system also compensates for any problems resulting from deviations of the platen from a horizontal plane. The system provides digital signals representing increments in the desired displacement, the desired velocity and the desired acceleration of the head relative to the platen. These signals may be represented at $x_i + f\dot{x}_i + k\ddot{x}_i$ for the x-axis and are introduced to comparators 520 and 522. The comparator 520 passes signals representing positive increments and the comparator 522 passes signals representing negative increments. The signals from the comparators 520 and 522 are converted to analog form by a resolver 524 which performs integration by counting the input pulses. A portion of the output from the resolver 524 accordingly represents a function of velocity. The output from the resolver 524 is introduced to a movable member such as a head 526.

An analog accelerometer 528 moves with the head to produce signals representing the acceleration of the head along the x-axis. These signals are compensated in a stage 530 and are provided with a factor $k$ in a stage 532 and are introduced to a differential or comparator 534. The gate 534 is included in an offset correction loop 536, gates 540 and 542, a counter 544 and a voltage conversion network 546.

The comparator 534 receives from the network 546 a signal which establishes a bias level in the comparator to control the passage of signals through the comparator. The signals passing through the comparator are converted by the generator 538 from an analog voltage to digital signals having a pulse rate proportional to the amplitude of the analog voltage. These signals pass through the gates 540 and 542 only during the time that the head 526 is not moving. This results from the fact that the gates 540 and 542 also receive signals through inverting amplifiers 548 and 550 from the computer logic signals providing for the movement of the head. These logic signals have a high amplitude to provide for a movement of the head and have a low amplitude to provide for a stationary disposition of the head.

Since the gates 540 and 542 pass signals only when the head is stationary, the digital signals passing through the gates represent errors resulting from any deviation of the platen from a horizontal disposition. The pulses passing through the gates 540 and 542 are counted by the counter 544 to provide an analog voltage which is converted to a reference or bias signal by the stage 546. This reference or bias level is maintained in the network 546 while the head is moving. This voltage is introduced to the differential 534 to provide a reference or bias level for the head during the time that the head is moving and until the next time that the head becomes stationary. By establishing the reference or bias level in the differential 534, the signals passing through the differential from the accelerometer 528 represent only the acceleration of the head relative to the platen along the x-axis.

The digital signals provided by the generator 538 to represent increments in the acceleration of the head relative to the platen along the x-axis pass through gates 552 and 554 during the time that the head is moving. This results from the introduction to the gates 552 and 554 from the computer of logic signals providing for a movement of the head. The signals passing through the gates 552 and 554 are introduced to the comparators 520 and 522. Signals representing positive increments from the gate 554 are introduced to the comparator 522 to be combined with signals representing negative increments of the desired displacement $x_i$, the desired velocity $\dot{x}_i$ and the desired acceleration $\ddot{x}_i$ of the head. Similarly, signals representing negative increments from the gate 552 are combined in the comparator 520 with signals representing positive increments in the desired acceleration $x_i$, the desired velocity $\dot{x}_i$ and the desired acceleration $\ddot{x}_i$ of the head. In this way, the signals passing to the resolver 524 represent only the differences between the desired and actual velocities of the head relative to the platen along the x-axis.

FIG. 19 discloses an arrangement which may be used instead of the systems shown in FIGS. 6 and 7 for producing a controllable power angle by the use of a rotary resolver. The resolver includes a pair of windings 560 and 562 having a phase-displaced relationship such as a quadrature relationship to each other. The windings 560 and 562 are disposed on a stationary member such as a stator. One terminal of each of the windings 560 and 562 is connected to a reference potential such as ground. The second terminals of the windings 560 and 562 respectively receive signals representing $P$ cosine $\beta$ and $P$ sine $\beta$.

A rotary shaft 564 is disposed within the stator and is disposed on an axis corresponding to the axis of the stator. The shaft 564 carries a pair of magnetoresistive or Hall Effect devices 566 and 568 having a phase-displaced relationship such as a quadrature relationship to each other. One terminal of each of the windings 566 and 568 is connected to the reference potential such as ground and the second terminals of the windings 566 and 568 are connected to terminals to provide an output voltage between these terminals.

The shaft 564 is rotated through an angle $\delta$ (FIG. 7a) relative to the stator. Since the stator receives signals having an angular displacement of $\beta$ on a phasor basis, the signals provided by the rotor have an angular displacement of $\beta + \delta$ on a phasor basis. The relationship between the angles $\beta$ and $\delta$ to obtain the power angle $\theta$ may be seen in FIG. 7a. In effect, the Hall Effect system shown in FIG. 19 constitutes the mechanical equivalent on a rotary basis of the electronic system shown in FIG. 7. The rotor winding 566 responds to the stator windings 560 and 562 to produce a signal equivalent to that produced by the added 100, and the rotor winding 568 responds to the stator windings 560 and 562 to produce a signal equivalent to that produced by the added 106.

FIG. 20 illustrates an arrangement for providing a complete acceleration sensing and integration system and synchronous motor damping loop in a given modulator assembly. In the embodiment shown in FIG. 20, signals representing a first trigonometric function such as cosine $2 \pi x_1/p$ are provided on a pair of lines 570 and 572. As will be appreciated, such signals represent a trigonometric function of the desired displacement of the head relative to the platen along the $x$-axis. Similarly, signals representing a trigonometric function sine $2 \pi x_1/p$ are provided on pair of lines 574 and 576.

The signals from the lines 570 and 572 are connected to the end terminals of a potentiometer 578 having an intermediate position connected to a reference potential such as ground. Similarly, the signals on the lines 574 and 576 are connected to the end terminals of a potentiometer 580 having an intermediate terminal connected to a reference potential such as ground.

The potentiometers 578 and 580 have movable arms which are coupled through a linkage 582 to a rotary shaft 584. One end of a bias spring 586 is connected to the shaft 584 and the other end of the spring is connected to a fixed member such as a housing 588. Similarly, the rotor 590 of a dashpot 592 is also connected to the shaft 584 for rotary movement with the shaft. The shaft 584 further carries an arm 594 having at its free end an unbalanced mass 596. The arm 594 is nominally centered by a spring 598 connected at one end to the arm 594 and at the other end to the housing 588.

The signal on the movable arm of the rheostat 578 is applied to a summer 600 as is the signal on the line 574. Similarly, the signal on the movable arm of the potentiometer 580 is applied to a summer 602 for addition with the signals on the line 570. The signals from the summers 600 and 602 are respectively introduced through power amplifiers 604 and 606 to the head to introduce a controllable power angle to the head for controlling the movements of the head along the $x$-axis.

Any acceleration of the head relative to the platen along the $x$-axis results in a corresponding acceleration of the mass 596. This causes the mass and the arm 594 to pivot in accordance with such acceleration and to produce a rotation of the shaft 584. The angular acceleration is controlled by the rotary dashpot 592 to convert the acceleration to a velocity represented by the angular displacement of the shaft 584 and the movable arms of the potentiometers 578 and 580.

The combination of cos signals from terminal 570, adder 602 and potentiometer 580 and also sine signals from terminal 574, adder 600 and potentiometer 578 all constitute a PAR which shifts the input phasor to the motor to control the power angle in proportion to the angle of the shaft 589 and hence the velocity of the head along the $x$-axis. This provides the desired velocity term and tends to damp the movement of the head along the $x$-axis.

The mass 596 may be centered by the spring 598 in its position of rest. As will be appreciated, the spring 598 may be optional. The bias spring 586 is provided to adjust for any deviation of the platen from a horizontal disposition.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination
   a first member,
   a second member disposed in cooperative relationship with the first member for movement relative to the first member,
   means for providing first and second recurrent analog signals having a particular phase relationship to each other,
   means operatively coupled to a particular one of the first and second members for energizing the second member in a particular periodic relationship in accordance with the recurrent relationship of the first and second recurrent analog signals to provide a movement of the second member relative to the first member in accordance with such particular relationship,
   the first and second members being constructed to provide a synchronous movement of the second member relative to the first member in accordance with the particular periodic relationship provided by the energizing means, and
   the first and second members being constructed to provide an acceleration of the second member relative to the first member in accordance with instantaneous shifts in the phase of each of the first and second signals,
   means for providing signals representing desired changes in the rate of displacement of the second member relative to the first member,
   means including a first multiplier and a first adder connected to each other and to the signal means and to the command signal means for shifting the phase of the first recurrent signals through a particular angle dependent upon the characteristics of the command signal, and means including a second multiplier and a second adder connected to each other and to the signal means and to the command signal means for shifting the phase of the second recurrent signals through the particular angle.

2. The combination set forth in claim 1 wherein the first member is planar and the second member is disposed in displaced but cooperative relationship with the first member for movement relative to the first member in shynchronism with the particular periodic relationship provided by the energizing means and the energizing means is magnetic and the first and second members are constructed to define an open loop synchronous motor.

3. In combination, a first member, a second member disposed in cooperative relationship with the first member for providing a displacement between the first and second members when one of the first and second members is energized, means disposed in cooperative relationship with a particular one of the first and second members for energizing the particular member to provide the displacement between the first and second members, first means operatively coupled to the energizing means for providing at least a pair of periodic signals having a particular phase relationship to each other, the first and second means being constructed to provide a displacement between the first and second members in synchronism with the periodic signals, the first and second members being constructed to provide an instantaneous acceleration of the second member relative to the first member in accordance with shifts in the phases of each of the signals introduced to the energizing means, second means for providing a command signal having characteristics representing a desired acceleration in the displacement between the first and second members, third means coupled to the first and second means for instantaneously shifting the phase of at least a first one of the periodic signals through a particular angle dependent upon the characteristics of the command signal, fourth means coupled to the first and second means for instantaneously shifting the phase of at least a second one of the periodic signals through the particular angle, fifth means operatively coupled to the third and fourth means for introducing the phase-shifted periodic signals to the energizing means to provide an instantaneous acceleration between the first and second members in accordance with the instantaneous shifts in the phases of the periodic signals, sixth means responsive to a funciton of the relative displacements between the first and second members for providing signals related to particular function of the instantaneous displacement of the second member relative to the first member, and seventh means responsive to the signals produced by the last mentioned means for introducing such signals to the third and fourth means to control the instantaneous shifts in the phase of the periodic signals produced by the third and fourth means.

4. The combination set forth in claim 3 wherein the first member is planar and is provided with a magnetic grid configuration to provide a movement between the first and second members in synchronism with the pair of periodic signals and wherein the energizing means produce magnetic flux for acting on the planar grid member to produce a synchronous displacement of the second member relative to the first member in accordance with the recurrent characteristics of the periodic signals and wherein the sixth means provide signals related to the velocity of the displacement of the second member relative to the first member to damp the displacement of the second member relative to the first member and the first and second members are constructed to define an open loop synchronous motor and wherein means are provided to increase the frequency of the periodic signals to produce a variable rate of displacement of the second member relative to the first member in accordance with the instantaneous accelerations imparted to the second member relative to the first member.

5. In combination, a first member, a second member disposed in cooperative relationship to the first member for displacement relative to the first member, first means operatively coupled to the second member for energizing a particular one of the first and second members in a periodic relationship to obtain the displacement of the second member relative to the first member in a particular direction to maintain the second member in cooperative relationship with the first member, the first and second members being constructed relative to each other to provide a displacement of the second member relative to the first member in synchronism with the periodic relationship of the energizing by the energizing means, second means for providing first and second trigonometric signals having a particular phase displacement relative to each other, third means for providing command signals having characteristics dependent upon an instantaneous acceleration to be imparted to the second member relative to the first member in the particular direction, fourth means including a first multiplier and a first adder connected to the second and third means for instantaneously shifting the phase of the first trigonometric signal through a particular angle dependent upon the characteristics of the command signal, fifth means including a second multiplier and a second adder connected to the second and third means for instantaneously shifting the phase of the second trigonometric signal through the particular angle, the first and second members being constructed relative to each other to provide instantaneous accelerations of the second member relative to the first member in accordance with the instantaneous shifts in the phase of the periodic energizing of the particular one of the members relative to the other, sixth means operatively coupled to the fourth and fifth means for introducing the phase-shifted signals from the fourth and fifth means to the energizing means to energize the particular one of the first and second members in the periodic relationship, seventh means responsive to the relative displacements between the first and second members for indicating a particular function of the instantaneous displacement of the second member relative to the first member, and servo means operatively coupled to the last mentioned means for varying the phases of the trigonometric signals from the fourth and fifth means in accordance with the indications from the seventh means to control the instantaneous shifts in phase of the periodic relationship of the energizing of the energizing means.

6. The combination set forth in claim 5 wherein the seventh means provides indications of the velocity of the second member relative to the first member and wherein the servo means feeds such indications back to the fourth and fifth means to tend to damp the movements of the second member relative to the first member and wherein the first member is planar and is in the form of a magnetic grid and wherein the second member is provided with magnetic properties to cooperate with the first member in producing a movement between the first and second members in synchronism with the periodic relationship of the energizing by the energizing means and the first and second members are constructed to provide an open loop synchronous motor and wherein means are provided for varying the frequencies of the first and second trigonometric signals to vary the rate of displacement of the second member relative to the first member in accordance with the accelerations imparted to the second member relative to the first member.

7. In combination, a first member, a second member disposed in contiguous relationship to the first member and cooperative with the first member when energized for providing a movement of the second member relative to the first member, first means for providing at least first and second signals having a particular phase displacement relative to each other, second means disposed relative to a particular one of the first and second members and responsive to the first and second signals for energizing the particular member in a periodic relationship to obtain a movement of the second member relative to the first member, the first and second members being constructed to provide a displacement of the second member relative to the first member in synchronism with the periodic relationship of the energizing means, third means for providing command signals having characteristics dependent upon the instantaneous acceleration to be imparted to the second member relative to the first member, fourth means operatively connected to the first and third means for instantaneously shifting the phase of at least the first signal introduced to the energizing means through a particular angle dependent upon the characteristics of the command signal, fifth means operatively connected to the first and third means for instantaneously shifting the phase of at least the second signal introduced to the energizing means through the particular angle, sixth means responsive to a function of the displacement of the second member relative to the first member for indicating a particular function of the instantaneous displacement of the second member relative to the first member, and servo means connected in a closed loop between the second means and the sixth means and responsive to the indications provided by the indicating means for instantaneously shifting the phases of at least the first and second signals in accordance with the indications from the sixth means to change the natural resonant frequency of the second member relative to the first member to facilitate the displacement of the second member relative to the first member.

8. In the combination set forth in claim 7, the first and second members being constructed to provide instantaneous changes in the acceleration of the second member relative to the first member in accordance with shifts in the phases of each of the first and second signals and the sixth means being responsive to the acceleration of the second member relative to the first member, the servo means including means operative to shift the phases of the first and second signals through phase angles dependent upon the indications provided by the sixth means, the first and second members being constructed relative to each other to define an open loop synchronous motor, the second means being operative to provide changes in the instantaneous acceleration of the second member relative to the first member in accordance with the shifts in the phases of the first and second signal, and means for varying the frequencies of at least the first and second signals to provide for variations in the rate of displacement of the second member relative to the first member in accordance with the accelerations imparted to the second member relative to the first member.

9. In combination, a first member, a second member disposed in cooperative relationship with the first member for providing a movement of the second member relative to the first member, first means for providing polyphase signals having recurrent characteristics and having a particular phase displacement relative to each other, second means for providing command signals having characteristics representing instantaneous accelerations to be imparted to the second member relative to the first member, third means responsive to the polyphase signals and to the command signals for providing controlled shifts in the phases of the polyphase signals in accordance with the characteristics of the command signals, fourth means disposed relative to a particular one of the first and second members and responsive to the polyphase phase-shifted signals from the third means for energizing the particular member in a periodic relationship in accordance with the phases of such signals to obtain instantaneous accelerations of the second member relative to the first member in accordance with the instantaneous phase shifts of the polyphase signals, the first and second members being constructed to provide a displacement of the second member relative to the first member in synchronism with the periodic relationship provided by the energizing means, fifth means operatively coupled to the second member for indicating the instantaneous velocity of the second member relative to the first member, and servo means connected in a closed loop between the phase-shifting means and the fifth means for feeding the velocity indications back to the third means in a particular relationship to control the instantaneous shifts in the phases of the polyphase signals in accordance with such velocity indications for damping the displacements of the second member relative to the first member.

10. The combination set forth in claim 9, including, the first member having first and second coordinate axes and the first and second members being constructed to provide simultaneous and independent movements of the second member relative to the first member along the first and second coordinate axes in synchronism with the energizing of the fourth means and the first and second members being constructed to define an open loop synchronous motor and the second means providing first and second command signals respectively for the first and second coordinate axes and the first means providing respectively first and second polyphase signals for the first and second coordinate axes and the third means including first and second phase-shifting means for respectively shifting the phases of the polyphase signals instantaneously for each of the first and second coordinate axes in accordance with the respective characteristics of the first and second command signals and the fourth means including first and second energizing means respectively responsive to the first and second phase-shifted polyphase signals for the first and second axes for energizing the particular member in the particular relationship to respectively obtain the movement of the second member relative to the first member along the first and second coordinate axes and the servo means including first and second servo means respectively connected in closed loops with the first and second energizing means for respectively feeding the velocity indications back to the first and second phase-shifting means in the particular relationships to instantaneously shift the phase of the first and second polyphase signals in accordance with the velocity indications and thereby tend to damp the displacements of the second member relative to the first member respectively along the first and second coordinate axes, the first member being planar and being provided with magnetic properties and the first and second energizing means being provided with magnetic properties for cooperating with the first member to produce a displacement between the first and second members respectively along the first and second axes and the first energizing means having properties of becoming selectively energized and of producing magnetic lines of force, when selectively energized, for cooperating with the first member to produce a displacement between the first and second members along the first coordinate axis and the second energizing means having properties of becoming selectively energized and of producing magnetic lines of force, when selectively energized, for cooperating with the first member to produce a displacement between the first and second members along the second coordinate axis.

11. In a system for providing a controlled relative movement between two members along first and second coordinate axes, the combination of;

a first member, a second member spaced from the first member and movable relative to the first member along the first and second coordinate axes and including means for producing an interaction with the first member to drive the second member relative to the first member along the first axis and including second means for simultaneously obtaining a determination of the position of the second member relative to the first member along the first axis during the displacement of the second member relative to the first member along the first axis and further including third means for producing an interaction with the first member to drive the second member relative to the first member along the second axis and including fourth means for simultaneously obtaining a determination of the position of the second member relative to the first member along the second axis during the displacement of the second member relative to the first member along the second axis, fifth means for respectively providing first polyphase signals having a periodic relationship and having a particular phase displacement relative to each other, sixth means for respectively providing second polyphase signals having a periodic relationship and having the particular phase displacement relative to each other, seventh means responsive to the first polyphase signals for providing for a selective energizing of the first means in a periodic relationship to obtain a selective driving of the second member relative to the first member along the first axis, eighth means responsive to the second polyphase signals for providing for a selective energizing of the third means in a periodic relationship to obtain a selective driving of the second member relative to the first member along the second axis, the first and second members being constructed to produce a displacement between the first and second members respectively along the first and second axes in synchronism with the periodic relationship of the selective energizings provided by the first and third means, the first and second members being constructed to provide an instantaneous acceleration of the second member relative to the first member along the first axis in accordance with instantaneous shifts in the phase of the first polyphase signals and to provide an instantaneous acceleration of the second member relative to the first member along the second axis in accordance with instantaneous shifts in phase of the second polyphase signals, ninth means for providing first command signals having characteristics representing desired accelerations to be instantaneously provided to the second member relative to the first member along the first axis, tenth means for providing second command signals having characteristics representing desired accelerations to be instantaneously provided to the second member relative to the first member along the second axis, eleventh means responsive to the first polyphase signals and the first command signals for instantaneously shifting the phases of the first polyphase signals through a first particular angle dependent upon the characteristics of the first command signals, twelfth means responsive to the second polyphase signals and the second command signals for instantaneously shifting the phases of the second polyphase signals through a second particular angle dependent upon the characteristics of the second command signal, thirteenth means operatively coupled to the second member for producing signals having characteristics representing a function of the velocity of the second member relative to the first member along the first coordinate axis, fourteenth means responsive to the signals produced by the thirteenth means for producing instantaneous shifts in the phase of the first polyphase signals from the eleventh means in accordance with the signals from the thirteenth means to provide a damping in the displacement of the second member relative to the first member along the first coordinate axis, fifteenth means operatively coupled to the second member for producing signals having characteristics representing a function of the velocity of the second member relative to the first member along the second coordinate axis, and sixteenth means responsive to the signals produced by the fifteenth means for producing instantaneous shifts in the phase of the second polyphase signals in accordance with the signals from the fifteenth means to provide a damping in the displacement of the second member relative to the first member along the second coordinate axis.

12. In the combination set forth in claim 11, the seventh means being operative to provide for a selective energizing of the first means in a periodic relationship and the eighth means being operative to provide for a selective energizing of the third means in a periodic relationship and the first and second members being constructed to provide simultaneous and independent displacements between the first and second members along the first and second coordinate axes in accordance with the periodic energizings of the seventh and eighth means and the first and second members being constructed to define an open loop synchronous motor, the first member being in the form of a magnetic grid and the first and third means being provided with magnetic properties and being disposed for cooperation with the first member to provide simultaneous and independent movements of the second member relative to the first member along the first and second axes and the first and second members being planar and being disposed in contiguous relationship to each other, seventeenth means for varying the frequency of the first polyphase signals to vary the rate of displacement of the second member relative to the first member along the first axis in accordance with the accelerations imparted to the second member relative to the first member along the first axis, and eighteenth means for varying the frequency of the second polyphase signals to vary the rate of displacement of the second member relative to the first member along the second axis in accordance with the accelerations imparted to the second member relative to the first member along the second axis.

13. In combination, a first member, a second member disposed in cooperative relationship with the first member for instantaneously producing forces between the first and second members in a direction to provide a displacement of the second member relative to the first member, first means for providing first polyphase signals having a periodic function and having a particular phase displacement relative to each other and representing a desired displacement between the first and second members, second means for energizing a particular one of the first and second members for producing instantaneous forces between the first and second members in the direction to provide the displacement of the second member relative to the first member, the first and second members being constructed to provide a displacement between the first and second members in synchronism with the first polyphase signals having the periodic function and to define an open loop synchronous motor, third means for providing command signals having characteristics representing the instantaneous force to be applied to the second member relative to the first member, fourth means for providing second polyphase signals having the particular phase displacement relative to each other, fifth means responsive to the second polyphase signals and to the command signals for instantaneously shifting the phases of the second polyphase signals in accordance with the characteristics of the command signals, the second means being connected to the fifth means for energizing the particular one of the first and second members in accordance with the characteristics of the phase-shifted signals from the fourth means to produce instantaneous forces between the first and second members in accordance with such phase shifts, sixth means responsive to the relative displacement between the first and second members for producing third signals having the periodic function and representing the actual displacement of the second
member relative to the first member,
seventh means connected in a feedback loop with the
first and fifth and sixth means for instantaneously
shifting the phases of the second polyphase signals
through angles dependent upon the relative differences in the characteristics of the third signals and
the second polyphase signals,
eighth means responsive to the phase-shifted second
polyphase signals for instantaneously controlling
the operation of the second means in producing instantaneous forces between the first and second
members in accordance with any instantaneous
shifts in the phase characteristics of the second
polyphase signals, and
ninth means responsive to the third signal for producing third polyphase signals having the periodic
function and having the particular phase displacement relative to each other and representing the
velocity of the second member relative to the first
member, and
tenth means responsive to the signals from the ninth
means and connected in the feedback loop for introducing such signals to the fifth means to control
the instantaneous phase shifts in the second polyphase signals and the instantaneous operation of
the second means in accordance with such phase-shifted second polyphase signals for providing
damping in the displacement of the second member relative to the first member,
the first and second members being constructed to
provide a movement of the second member relative
to the first member in synchronism with the recurrent characteristics of the second polyphase signals.

14. The combination set forth in claim 13, including eleventh means for providing fourth polyphase signals having the periodic function and having the
particular phase displacement relative to each
other and representing the desired velocity of the
second member relative to the first member and
twelfth means responsive to the signals from the
eleventh means for introducing the signals from the
eleventh means to the fifth means to obtain the instantaneous shifts in the phases of the second polyphase signals in accordance with the characteristics
of the signals from the eleventh means relative to
the characteristics of the third polyphase signals
from the ninth means.

15. The combination set forth in claim 3 wherein
the energizing means are provided as a spaced pair of
energizing means and are included in at least one
of the first and second members for inhibiting any
rotation of the second member relative to the first
member about an axis normal to the displacement
of the second member relative to the first member
and wherein the third means include a first pair of
phase-shifting means each associated with an individual one of the energizing means in the pair and
the fourth means include a second pair of phase-shifting means each associated with an individual
one of the energizing means in the pair and wherein
means are responsive to the signals related to the
particular function of the displacement of the second member relative to the first member for providing a pair of feedback signals having a periodic
function and the particular phase displacement relative to each other and representing a particular
function of the instantaneous rotation of the second member relative to the first member about the
axis normal to the movement of the second member relative to the first member and wherein first
feedback means are included for introducing such
feedback signals to the pair of phase-shifting means
in the third means in a first particular relationship
to control the instantaneous shifts in the phase of
the pair of periodic signals produced by the third
means for introduction to one of the energizing
means in the pair and wherein second feedback
means are included for introducing such feedback
signals to the pair of phase-shifting means in each
of the fourth means in a second particular relationship to control the instantaneous shifts in the pair
of periodic signals produced by the fourth means
for introduction to the other one of the energizing
means in the pair, thereby to damp any instantaneous rotation of the second member relative to
the first member about the axis normal to the displacement of the second member relative to the
first member.

16. The combination set forth in claim 5, including, the energizing means being disposed in a spaced pair
on at least one of the first and second members for
inhibiting any instantaneous rotation of the second
member relative to the first member about an axis
substantially normal to the displacement of the second member relative to the first member,
eighth means responsive to the indications from the
seventh means for providing indications representing a particular function of the instantaneous rotation of the second member relative to the first
member about the axis substantially normal to the
displacement of the second member relative to the
first member,
the fourth means including a first pair of phase-shifting means each associated with an individual
one of the energizing means in the pair,
the fifth means including a second pair of phase-shifting means each associated with an individual
one of the energizing means in the pair,
ninth means responsive to the indications from the
eighth means for introducing such indications back
to the pair of the phase-shifting means in the fourth
means in a first relationship to control the instantaneous shifts in the phases of the first and second
trigonometric signals introduced to the first energizing means in the pair and thereby provide a
damping of the rotation of the second member relative to the first member about the axis normal to
the displacement of the second member relative to
the first member, and
tenth means responsive to the indications from the
eighth means for introducing such indications back
to the pair of the phase-shifting means in the fifth
means in a second relationship to control the instantaneous shifts in the phases of the first and second trigonometric signals introduced to the second
energizing means in the pair and thereby provide a
damping of the rotation of the second member relative to the first member about the axis normal to
the displacement of the second member relative to
the first member.

17. The combination set forth in claim 7, including, second means being disposed in a spaced pair for inhibiting any instantaneous rotation of the second member relative to the first member about an axis substantially normal to the movement of the second member relative to the first member, the fourth means including a pair of phase-shifting means each associated with an individual one of the second means in the pair, the fifth means including a pair of phase-shifting means each associated with an individual one of the second means in the pair, seventh means responsive to the indications from the sixth means of the particular function of the instantaneous displacement of the second member relative to the first member for providing indications representing a particular function of the instantaneous rotation of the second member relative to the first member about the axis substantially normal to the displacement of the second member relative to the first member, eighth means responsive to the indications of the particular function of the instantaneous rotation of the second member relative to the first member for introducing such indications to the pair of the phase-shifting means in the fourth means in a first relationship to obtain instantaneous shifts in the phases of the first and second signals introduced to a first one of the second means in the pair in accordance with such indications to provide a damping of such rotation of the second member relative to the first member about the axis substantially normal to the displacement of the second member relative to the first member, and ninth means responsive to the indications of the instantaneous function of the instantaneous rotation of the second member relative to the first member for introducing such indications to the pair of the phase-shifting means in the fifth means in a second relationship to obtain instantaneous shifts in the phases of the first and second signals introduced to the other one of the second means in the pair in accordance with such indications to provide a damping of such rotation of the second member relative to the first member about the axis substantially normal to the displacement of the second member relative to the first member.

18. The combination set forth in claim 9, including, the fourth means being disposed in a spaced pair for inhibiting any rotation of the second member relative to the first member about an axis substantially normal to the displacement of the second member relative to the first member, the third means including a pair of phase-shifting means each associated with an individual one of the fourth means in the pair, sixth means responsive to the indications from the fifth means of the velocity of the second member relative to the first member for providing indications representing the velocity of any instantaneous rotation of the second member relative to the first member about the axis substantially normal to the displacement of the second member relative to the first member, and seventh means responsive to the indications from the sixth means of the velocity of rotation of the second member relative to the first member for introducing such indications to a first one of the phase-shifting means in a first relationship to instantaneously shift the phases of the first and second signals introduced to one of the energizing means in the pair in accordance with such indications from the sixth means to provide a damping of such rotation of the second member relative to the first member about the axis substantially normal to the displacement of the second member relative to the first member, and eighth means responsive to the indications from the sixth means of the velocity of rotation of the second member relative to the first member for introducing such indications to the other one of the phase-shifting means in a second relationship to instantaneously shift the phases of the first and second signals introduced to the other one of the energizing means in the pair in accordance with the indications from the sixth means to provide a damping of such rotation of the second member relative to the first member about the axis substantially normal to the displacement of the second member relative to the first member.

19. The combination set forth in claim 11, including, the first means being disposed in a pair spaced on opposite sides of the first axis and the third means being disposed in a pair spaced on opposite sides of the second axis for inhibiting any rotation of the second member relative to the first member about an axis substantially normal to the surface defined by the first and second coordinate axes, seventeenth means responsive to the signals from the thirteenth means for producing signals representing a function of any velocity of rotation of the second member relative to the first member about the axis substantially normal to the surface defined by the first and second coordinate axes, the eleventh means including a pair of phase-shifting means each associated with an individual one of the second means in the part, the twelfth means including a pair of phase-shifting means each associated with an individual one of the fourth means in the pair, eighteenth means responsive to the signals from the thirteenth means for introducing such signals to each of eleventh means in the pair to shift instantaneously the phases of the first polyphase signals through angles for providing a damping of any rotation of the second member relative to the first member about the axis substantially normal to the surface defined by the first and second coordinate axes, nineteenth means responsive to the signals from the eighteenth means for introducing such signals to each of the twelfth means in the pair to shift instantaneously the phases of the second polyphase signals in the pair through angles for providing a damping of any rotation of the second member relative to the first member about the axis substantially normal to the surface defined by the first and second coordinate axes, twentieth means responsive to any disposition of the second member in other than a particular plane for providing signals representing such other disposition, and twenty-first means responsive to the signals from the twentieth means for varying the characteristics of the first and second command signals from the ninth and tenth means in accordance with the signals from the twentieth means to compensate for such disposition of the second means in other than the particular plane.

20. The combination set forth in claim 13, including, second means being disposed in a spaced pair for inhibiting any rotation of the second member relative to the first member about an axis substantially normal to the displacement of the second member relative to the first member,
eleventh means responsive to the signals from the ninth means for producing signals representing any velocity of the second member relative to the first member about the axis substantially normal to the displacement of the second member relative to the first member,
the seventh means being provided in a pair each associated with an individual one of the second means in the pair,
twelfth means responsive to the signals from the eleventh means for controlling the phase-shifts provided in the second polyphase signals by one of the seventh means in the pair to provide a damping of any rotation of the second member about the axis substantially normal to the displacement of the second member relative to the first member, and
thirteenth means responsive to the signals from the eleventh means for controlling the phase shifts provided in the second polyphase signals by the other one of the seventh means in the pair to provide a damping of any rotation of the second member about the axis substantially normal to the displacement of the second member relative to the first member, the first and second members being planar.

21. In combination,
a first member,
a second member disposed in cooperative relationship with the first member and constructed relative to the first member to produce forces between the first and second members in a direction to provide a displacement of the second member relative to the first member,
first means for producing polyphase signals having a particular phase displacement relative to each other and having a periodic relationship,
second means having a periodic function for energizing a particular one of the first and second members in the periodic relationship in accordance with the characteristics of the polyphase signals to produce forces between the first and second members in the direction to provide the displacement of the second member relative to the first member,
the first and second members being constructed to provide a displacement between the first and second members in synchronism with the periodic energizings of the particular one of the first and second members,
third means including the second means for inhibiting any rotation of the second member relative to the first member about an axis substantially normal to the displacement of the second member relative to the first member, fourth means operatively coupled to one of the first and second members for producing signals representing the rate of the actual displacement of the second member relative to the first member, and
fifth means responsive to the signals from the fourth means for instantaneously shifting the phases of the polyphase signals from the first means to damp any rotation of the second member relative to the first member about the axis substantially normal to the displacement of the second member relative to the first member.

22. In combination,
a first member,
a second member disposed in cooperative relationship with the first member for movement relative to the first member,
first means for providing first polyphase signals have a periodic function and a particular phase displacement relative to each other and representing a desired displacement of the second member relative to the first member,
second means for providing second polyphase signals having the periodic function and the particular phase relationship,
third means for providing a command signal having characteristics representing a desired acceleration of the second member relative to the first member, fourth means responsive to the signals from the second and third means for instantaneously shifting the signals from the second means through a controllable power angle in accordance with the characteristics of the command signal to facilitate the movements of the second member relative to the first member,
fifth means responsive to the signals from the fourth means for energizing a particular one of the first and second members in accordance with such signals to provide instantaneous and controlled changes in the acceleration between the first and second members in accordance with the instantaneous shifts in phase of such signals,
sixth means operatively coupled to one of the first and second members for producing signals having the periodic function and representing a particular function of the actual displacement between the first and second members,
the first and second members being constructed to provide a displacement between the first and second members in synchronism with the periodic function of the signals from the fourth means,
the first and second members being constructed to provide an instantaneous acceleration between the first and second members in accordance with the instantaneous shifts in phase of the second polyphase signals, and
seventh means responsive to the signals from the sixth means for introducing such signals to the fourth means to vary the instantaneous shift in phase of the second polyphase signals in accordance with the signals from the sixth means to control any rotation of the second member relative to the first member about an axis substantially normal to the displacement between the first and second members.

23. The combination set forth in claim 22 wherein the sixth means produce signals having characteristics to represent the velocity between the first and second members and wherein the seventh means introduce the signals from the sixth means to the fourth means to vary the phase shift of the second polyphase signals in a manner to damp any rotation of the second member relative to the first member about the axis substantially normal to the displacement between the first and second members and wherein the first member is magnetic and is planar and the first and second members are constructed to define an open loop synchronous motor and the fifth means provide magnetic forces which interact with the first member to provide controlled displacements of the second member relative to the first member.

24. The combination set forth in claim 13 wherein the fifth means include a first adder and a first multiplier responsive to the second polyphase signals and the command signal for instantaneously shifting the phase of one of the second polyphase signals through the particular angle in accordance with the characteristics of the command signal and further include a second adder and a second multiplier responsive to the second polyphase signals and the command signal for instantaneously shifting the phase of another one of the second polyphase signals through the particular angle in accordance with the characteristics of the command signal.

25. The combination set forth in claim 9 wherein the third means include a first adder and a first multiplier responsive to the polyphase signals and the command signal for instantaneously shifting the phase of one of the polyphase signals through an angle dependent upon the characteristics of the command signal and further include a second adder and a second multiplier responsive to the polyphase signals and the command signal for instantaneously shifting the phase of another one of the polyphase signals through such angle.

* * * * *